United States Patent [19]

Nimmagadda et al.

[11] Patent Number: 5,732,131
[45] Date of Patent: Mar. 24, 1998

[54] SYSTEM AND METHOD FOR IMPLEMENTING LOCAL NUMBER PORTABILITY

[75] Inventors: Prasad V. Nimmagadda; Robert V. Epley, both of Norcross, Ga.

[73] Assignee: BellSouth Corporation, Atlanta, Ga.

[21] Appl. No.: 760,657

[22] Filed: Nov. 19, 1996

[51] Int. Cl.$^6$ .......................... H04M 3/42; H04M 7/00; H04M 3/00
[52] U.S. Cl. .................. 379/211; 379/213; 379/220; 379/230; 379/246; 379/258
[58] Field of Search ..................... 379/201, 207, 379/210, 211, 212, 213, 219, 220, 225, 229, 230, 246, 258

[56] References Cited

U.S. PATENT DOCUMENTS

| | | | |
|---|---|---|---|
| 4,959,856 | 9/1990 | Bischoff et al. | 379/245 |
| 5,544,236 | 8/1996 | Andruska et al. | 379/207 X |
| 5,577,110 | 11/1996 | Aquino | 379/207 X |
| 5,598,464 | 1/1997 | Hess et al. | 379/230 X |

*Primary Examiner*—Harry S. Hong
*Attorney, Agent, or Firm*—Jones & Askew, LLP

[57] ABSTRACT

A system and method for routing communications to a terminating station associated with a porting subscriber directory number when the porting subscriber line 14a is cut-over from a donor switch 12a to a donee switch 12b. Upon cut-over of the porting subscriber line 14a, a local number portability (LNP) activation telephone call is placed to a dial-in platform 50 that activates a previously provisioned but inactive LNP database entry for the porting subscriber directory number. The LNP database entry is located in an LNP database 42a at a service control point (SCP) 28a. The dial-in platform 50 also activates a previously provisioned but inactive directory-number-level trigger for the porting subscriber directory number at the donor switch 12a. Activating the directory-number-level trigger for the porting subscriber directory number at the donor switch 12a causes the donor switch 12a to hold a subsequently received telephone call directed to the porting subscriber directory number. The donor switch 12a then transmits a query message to the SCP 28a and holds the telephone call until it receives a response message including routing instructions from the SCP 28a. Activating the LNP database entry for the porting subscriber directory number in the LNP database 42a at the SCP 28a associates the porting subscriber directory number with the donee switch 12b. Activating the LNP database entry therefore allows the SCP 28 to determine the correct terminating switch for the held telephone call, which after cut-over, is the donee switch 12b.

19 Claims, 12 Drawing Sheets

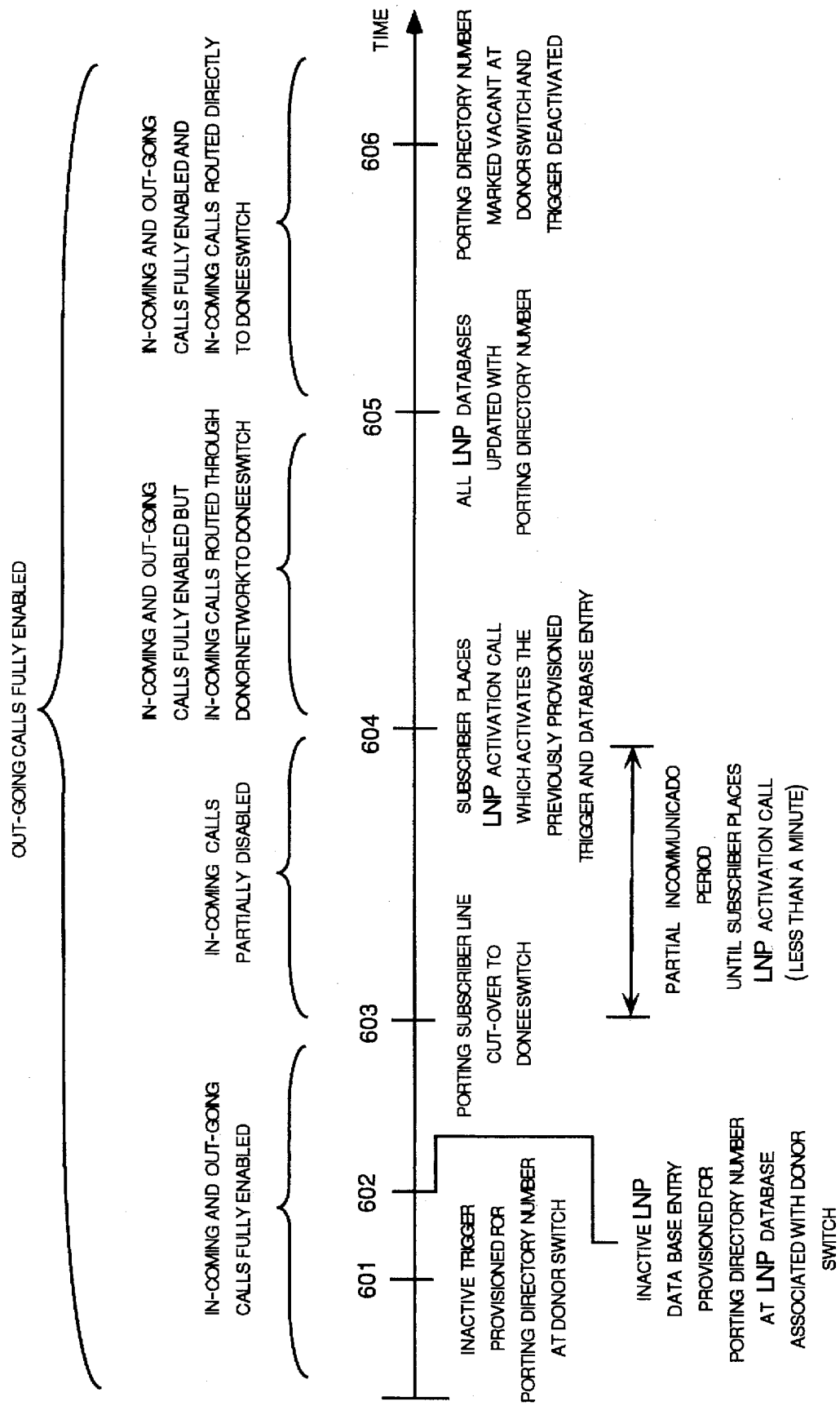

1

SYSTEM AND METHOD FOR IMPLEMENTING LOCAL NUMBER PORTABILITY

TECHNICAL FIELD

The present invention relates generally to telecommunications systems, and more particularly, relates to a system and method for routing communications to a terminating station associated with a porting subscriber directory number in an intelligent switched telecommunications network configured for local number portability.

BACKGROUND OF THE INVENTION

The present invention is concerned with telephone service subscribers that may, in the future, have the option of changing their local telephone service providers. The United States government has proposed or enacted laws are intended to allow telephone service subscribers to change their local telephone service providers. These laws may require that subscribers will not have to change their directory numbers when changing their local telephone service providers. In other words, a local telephone service subscribers will be able to keep the same directory number when selecting a new local telephone service provider. Allowing a subscriber to change its local telephone service provider and retain the same directory number is known as "local number portability."

It is also believed that providing substantially uninterrupted telephone service for subscribers changing their local telephone service providers will be advantageous. These two objectives, local number portability and providing substantially uninterrupted telephone service for subscribers changing their local telephone service providers, are presently in conflict. A description of this conflict requires a description of conventional telephone call routing procedures and the new telephone call routing procedures that will be required to implement local number portability. A few introductory definitions will aid the following discussion, which will refer to the physical structures of a conventional land-line telecommunications system.

Conventional Telephone Call Routing Procedures

A central office switch, referred to as a "switch," is a telecommunications switching device for connecting voice-channel circuits between voice-channel lines, referred to as "subscriber telephone lines." A switch serves as the gateway between a large number of subscriber telephone lines and the rest of local exchange carrier's system, which typically includes a local exchange network as well as connections to several long distance networks.

A switch is said to "service" the subscriber telephone lines that are directly connected to the switch. Typically, the number of subscriber telephone lines serviced by each switch is on the order of 10,000 to 70,000 lines. Each subscriber telephone line is typically connected to at least one piece of terminating equipment, referred to as a terminating "station," such as a conventional line-connected telephone, a wireless telephone, a facsimile machine, a computer, a modem, etc. Several stations may be connected to the same subscriber telephone line. For example, several telephones, a facsimile machine, and a computer with a modem may all be connected to a single subscriber telephone line.

Each subscriber telephone line is assigned a "directory number." A directory number, commonly referred to as a telephone number, is the number that is dialed or input by a calling party to place a telephone call to a station connected to a subscriber line associated with the dialed directory number. Each subscriber telephone line is assigned at least one directory number, although more than one directory number may be assigned to an individual subscriber telephone line. A directory number may also be assigned to a telecommunications device other than a subscriber line, such as a specialized telephone call handling platform that may operate as a switching device or perform other functions, such as voice mail, operator assistance, etc.

For convenience, a number of terms are used to describe the telecommunications devices participating in a particular telephone call. The station from which a calling party places the telephone call is referred to as the "originating station." The subscriber line serving the originating station is referred to as the "originating line," and the switch servicing the originating line is referred to as the "originating switch." Similarly, the station receiving the telephone call is referred to as the "terminating station." The subscriber line serving the terminating station is referred to as the "terminating line," and the switch servicing the terminating line is referred to as the "terminating switch."

It should be understood that efficient routing of telephone calls generally requires identification of the midst direct available communication path from an originating station to a terminating station. In particular, it is advantageous for a communication path from the originating station to the terminating station to be identified at the earliest possible point in the communication path. It is therefore desirable for an originating switch to be operable for determining the correct terminating station for a particular telephone call before further routing the telephone call. Advantageously, an originating switch can presently determine the correct terminating switch for a particular telephone call because the dialed directory number uniquely identifies the correct terminating switch for the telephone call.

More specifically, each directory number in the United States includes ten digits (e.g. 404-222-2500). A group of 10,000 directory numbers having the same first six digits is referred to as an "NPA-NXX." For example, there are 10,000 ten-digit directory numbers that start with 404-222 (i.e., 404-222-0001, 404-222-0002, etc.). Each NPA-NXX is assigned to a single switch, but more that one NPA-NXX may be assigned to any particular switch. That is, the 10,000 directory numbers that start with 404-222 are assigned to a particular switch, the 10,000 directory numbers that start with 404-333 are also assigned to a particular switch, and so on. Some of the 10,000 directory number of an NPA-NXX may be assigned to subscriber telephone lines, whereas some may be unassigned. An unassigned directory number is referred to as a "vacant" directory number.

Thus, when a calling party places a telephone call, the first six digits of the dialed directory number uniquely identify the correct terminating switch for the telephone call. The originating switch relies on this relationship to determine the most efficient routing path from the originating switch to the terminating switch. Specifically, each switch typically includes sufficient memory capacity to store an NPA-NXX database, which cross-references the various NPA-NXXs to the various switches. For example, an originating switch that receives a telephone call to 404-222-2500 simply collects the digits dialed by the calling party and refers to its internal NPA-NXX database to determine the switch that is assigned the 404-222 NPA-NXX. The originating switch then routes the telephone call to the correct terminating switch, which further routes the telephone call to the correct subscriber telephone line. Most telephone calls are presently routed using these conventional telephone call routing procedures, although many telephone calls involve more sophisticated telephone call routing procedures, as is well known to those skilled in the art.

The Need For New LNP Telephone Call Routing Procedures

As noted above, it is anticipated that more than one local telephone service provider in the same geographic area may install and maintain the switching equipment required to provide local telephone service. Local telephone service subscribers may then change their telephone service providers by having the lines servicing their premises physically disconnected from their previous local telephone service providers and reconnected to their new local telephone service providers. The disconnection and reconnection operation, referred to as a "cut-over," may take place at any point in the telephone line circuit to a subscriber's premises. For example, a subscriber line may be cut-over at the terminal jack located at the subscriber's premises, at the local telephone service provider's distribution frame, or at any other point in the circuit, as is well known to those skilled in the art.

The local telephone service subscriber changing local telephone service providers is referred to as a "porting subscriber," and the telephone line servicing the porting subscriber's premises is referred to as the "porting subscriber line." The local telephone service provider's switch that services the porting subscriber line before cut-over is referred to as the "donor switch." The local telephone service provider's switch that services the porting subscriber line after cut-over is referred to as the "donee switch." Local number portability requires that a porting subscriber directory number be "reassigned" from the donor switch to the donee switch in connection with the porting subscriber line being physically cut-over from the donor switch to the donee switch. In this manner, the porting subscriber may change telephone service providers and retain the same directory number.

In a local number portability environment, therefore, the NPA-NXX of a directory number will not uniquely identify the switch servicing the line assigned to that directory number. For example, in a local number portability environment, all lines assigned 404-222 directory numbers may no longer be serviced by the same switch. Thus, the conventional telephone call routing procedures described previously will no longer be viable in a local number portability environment. Additional telephone call routing procedures will be required to allow an originating switch that initially receives a telephone call to determine the correct terminating switch. In fact, it is anticipated an originating switch will refer to a database, known as a local number portability (LNP) database, that cross-references individual "portable" directory numbers to the various switches. It is also anticipated that many local telephone service providers will maintain separate LNP databases.

Thus, upon receiving telephone calls directed to a porting subscriber directory number, originating stations throughout the public switched telephone network will refer to their respective LNP databases to determine the terminating stations that service porting subscriber telephone lines. Whenever a porting subscriber changes local telephone service providers, all of these LNP databases will have to be programmed with the porting subscriber directory number and an identification code for the donee switch. The previously mentioned conflict between local number portability and providing substantially uninterrupted telephone service for porting subscribers arises because the various LNP databases located throughout the public switched telephone network cannot be programmed instantaneously, and any delay in programming the various LNP databases can cause a partial interruption of telephone service for the porting subscriber.

More specifically, the previously mentioned conflict between local number portability and providing substantially uninterrupted telephone service for porting subscribers is basically a timing problem associated with programming the various LNP databases. Until the porting subscriber line is physically cut-over from the donor switch to the donee switch, telephone calls directed to the porting subscriber directory number must be routed to the donor switch. After the porting subscriber line has been cut-over, telephone calls directed to the porting subscriber directory number must be routed to the donee switch. The timing problem arises because physical cut-over of the subscriber line occurs at an instant in time. The various LNP databases located throughout the portability area, on the other hand, cannot be programmed instantaneously. In fact, the time required to complete LNP programming for a porting subscriber, which is referred to as the "partial incommunicado period," is presently estimated to range from as little as about twenty minutes to as much as about eight hours.

The partial incommunicado period begins immediately upon cut-over, and ends upon completion of the LNP programming process. During the partial incommunicado period, the porting subscriber may place out-going telephone calls, but incoming telephone calls are partially disabled. Initially, incoming telephone calls from all originating switches other than the donee switch are disabled. It is anticipated that as the LNP programming process progresses, incoming telephone calls will be enabled, more or less, one LNP database at a time in an unpredictable manner. There may be no way for a porting subscriber to determine the status of incoming telephone call enablement at any particular point in time.

Moreover, there may not be a suitable announcement or other telephone call handling procedure applied to a telephone call that cannot be connected with the porting subscriber line. For example, a telephone call directed to a porting subscriber directory number may be received by an originating switch that has not had its respective LNP database updated for that particular porting subscriber directory number. In this case, the originating switch will route the telephone call to the donor switch rather than to the donee switch. The donor switch, in turn, may simply apply a ringing voltage to the porting subscriber telephone line, which after cut-over is a disconnected stub.

Many potential porting subscribers, such as businesses, parents of new born children, on-call emergency personnel, and the like may by unwilling to suffer a partial incommunicado period. There is, therefore, a need for a system and method for routing communications to a terminating station associated with a porting subscriber directory number in an intelligent switched telecommunications network configured for local number portability. There is a further need for a system and method for providing substantially uninterrupted telephone service to porting subscribers in an intelligent switched telecommunications network configured for local number portability.

SUMMARY OF THE INVENTION

The present invention meets the above-described needs by providing a system and method for implementing local number portability (LNP) that provides porting subscribers with substantially uninterrupted telephone service. In other words, the present invention is a method and system for minimizing the disruption in telephone service for telephone service subscribers that change their local telephone service providers. In particular, the present invention provides a system and method for provisioning an inactive LNP database entry and an inactive directory-number-level trigger for a porting subscriber directory number prior to cut-over of the porting subscriber line. Upon cut-over, an authorized person may place an LNP activation telephone call to a dial-in platform to activate the LNP database entry and the directory-number-level trigger for the porting subscriber directory number. Activating the LNP database entry and the directory-number-level trigger fully enables incoming telephone calls to the porting subscriber line. The dial-in platform preferably completes the LNP activation process during the LNP activation telephone call and provides an appropriate announcement prior to disconnection of the LNP activation telephone call.

Generally described, the present invention provides, in an intelligent switched telecommunications network configured for local number portability, a method for routing communications to a terminating station associated with a porting subscriber directory number. Carrier change data is received indicating that the porting subscriber directory number will be reassigned from a donor switch to a donee switch. In response to the carrier change data, an inactive database entry associating the porting subscriber directory number with the donee switch is provisioned in a database associated with the donor switch. Cut-over data is received indicating that the porting subscriber directory number has been reassigned from the donor switch to the donee switch. In response to the cut-over data, the previously provisioned but inactive database entry is activated. The cut-over data may be received via a dial-in notification.

According to another aspect of the present invention, in response to the carrier change data, an inactive directory-number-level trigger associated with the porting subscriber directory number is provisioned at the donor switch. In response to the cut-over data, the previously provisioned but inactive directory-number-level trigger associated with the porting subscriber directory number is activated. A communication directed to the porting subscriber directory number may then be received at the donor switch. In response the active directory-number-level trigger associated with the porting subscriber directory number, a query is conducted of the database associated with the donor switch. In response to the query, the communication is routed from the donor switch to the donee switch for connection with the porting subscriber line. The porting subscriber directory number may subsequently be marked vacant at the donor switch, and the directory-number-level trigger associated with the porting subscriber directory number may be deactivated.

According to another aspect of the present invention, before the carrier change data is received, a group-level trigger for a group of directory numbers associated with the donor switch is activated at a third-party switch. After the previously provisioned but inactive database entry associating the porting subscriber directory number with the donee switch is activated, the database associated with the third-party switch is updated with an entry associating the porting subscriber directory number with the donee switch. A second communication directed to the porting subscriber directory number is subsequently received at the third-party switch. In response to the active group-level trigger at the third-party switch, the database associated with the third-party switch is queried. In response to the database query, a reply is received including data from the database entry associating the porting subscriber directory number with the donee switch. In response to the reply, the second communication is routed from the third-party switch to the donee switch for connection with the terminating station associated with the porting subscriber directory number.

The present invention also provides a system for routing communications to a terminating station associated with a porting subscriber directory number. The system includes a donor switch having an assigned group of directory numbers. The system also includes a donee switch and a voice-channel communications network operative for functionally connecting the donor switch, the donee switch, and one or more third-party switches. The donor switch includes a previously provisioned but inactive directory-number-level trigger associated with a porting subscriber directory number. The directory-number-level trigger indicates that a query of the database element associated with the donor switch is required for each communication received at the donor switch that is directed to the porting subscriber directory number. The system also includes means, such as a dial-in platform, for receiving cut-over data indicating that the porting subscriber directory number has been reassigned from the donor switch to the donee switch. The system also includes means, such as a dial-in platform, for activating, in response to receiving the cut-over data, the previously provisioned but inactive directory-number-level trigger associated with the porting subscriber directory number.

According to another aspect of the present invention, the system also includes a database associated with the donor switch including an inactive entry indicating that the porting subscriber directory number has been reassigned to the donee switch. The system also includes means, such as a dial-in platform, for activating the entry in the database associated with the donor switch indicating that the porting subscriber directory number has been reassigned to the donee switch.

The present invention also provides a dial-in platform operable for receiving cut-over data indicating that a porting subscriber directory number has been reassigned from a donor switch to a donee switch. In response to receiving the cut-over data, the dial-in platform is operable for activating a previously provisioned but inactive entry in a database associated with the donor switch, which database entry indicates that the porting subscriber directory number has been reassigned to the donee switch. The dial-in platform is also operable for activating a previously provisioned but inactive directory-number-level trigger at the donor switch, which directory-number-level trigger indicates that a query of the database associated with the donor switch is required for each communication received at the third-party switch that is directed to the porting subscriber directory number.

It is therefore an object of the invention to provide a system and method for implementing local number portability. It is a further object of the present invention to provide a system and method for routing communications to a terminating station associated with a porting subscriber directory number in an intelligent switched telecommunications network configured for local number portability. It is a further object of the present invention to provide a system and method for providing substantially uninterrupted telephone service to porting subscribers in an intelligent switched telecommunications network configured for local number portability.

That the present invention improves over the drawbacks of the prior art and accomplishes the objects of the invention will become apparent from the detailed description of the preferred embodiment to follow.

BRIEF DESCRIPTION OF THE DRAWINGS

FIG. 6 is an event diagram that illustrates a sequence of events for implementing local number portability in accordance with a disclosed embodiment of the present invention.

FIG. 7, including

DETAILED DESCRIPTION OF THE PREFERRED EMBODIMENTS

Figure 1:
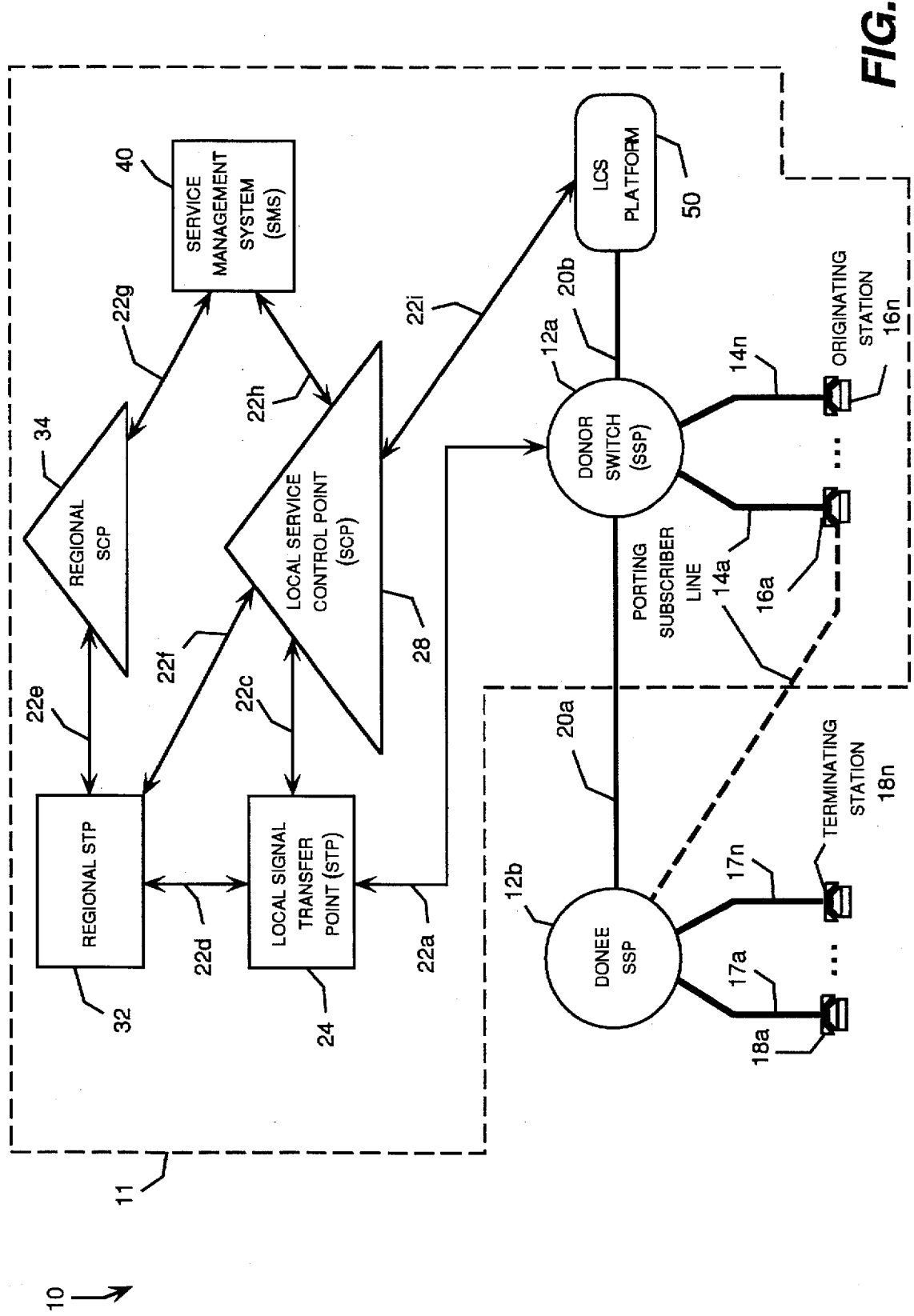
FIG. 1 is a functional block diagram of an intelligent switched telecommunications network that provides the operating environment for a disclosed embodiment of the present invention.
Figure 2:
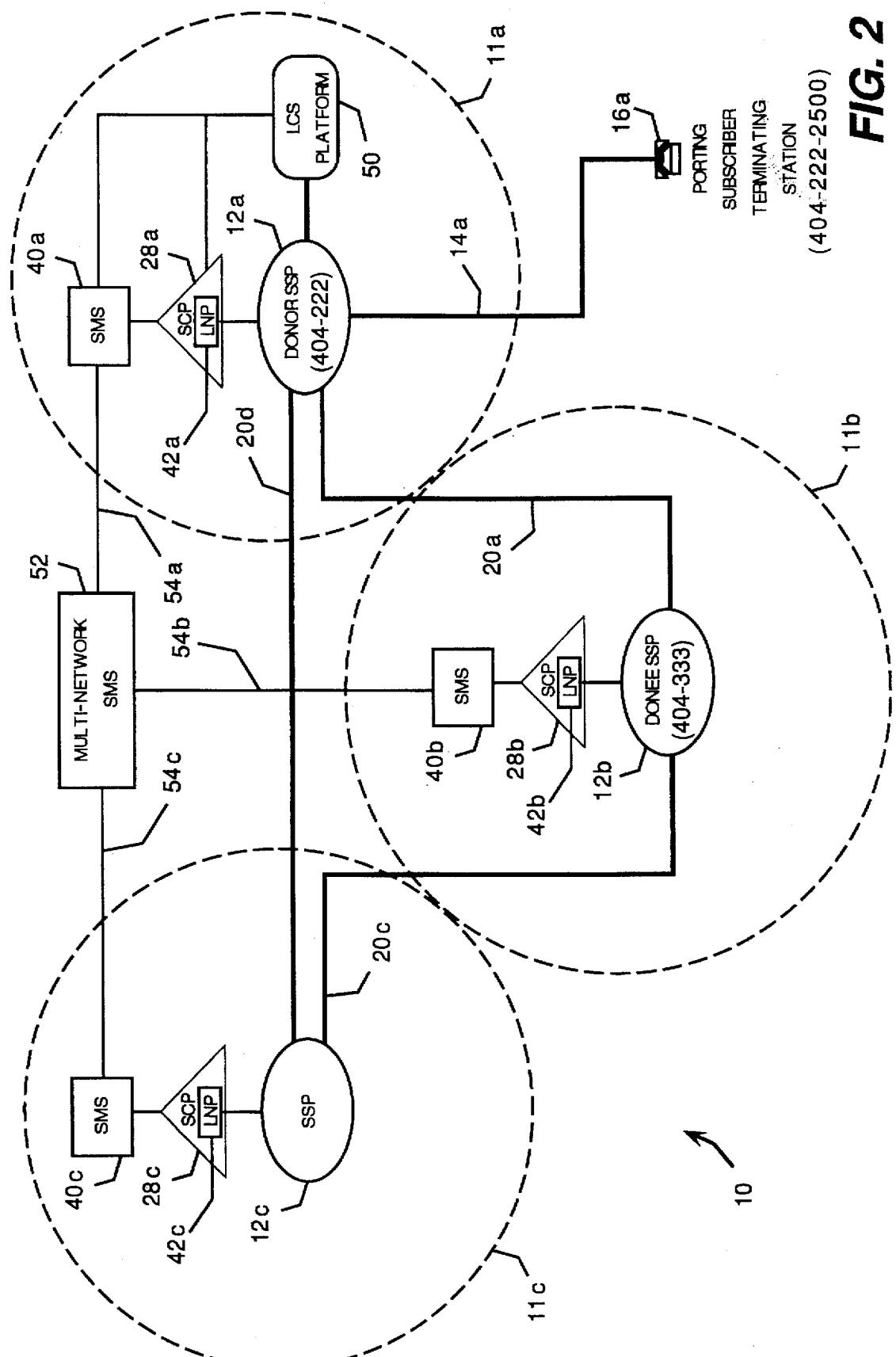
FIG. 2 is a functional block diagram of-an intelligent switched telecommunications network configured for local number portability before a porting subscriber line has been cut-over from a donor switch to a donee switch in accordance with a disclosed embodiment of the present invention.
Figure 3:
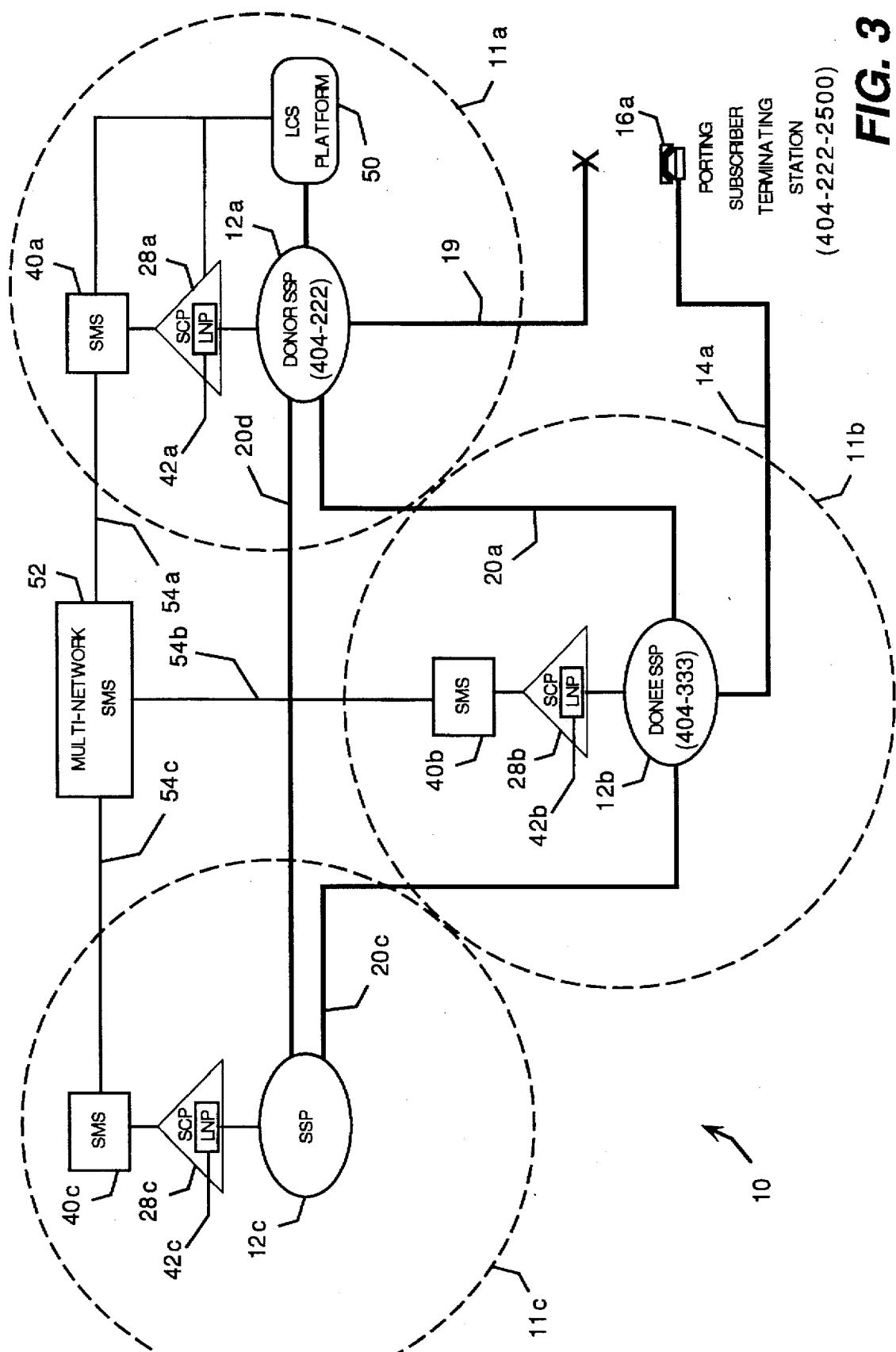
FIG. 3 is a functional block diagram of an intelligent switched telecommunications network configured for local number portability after a porting subscriber line has been cut-over from a donor switch to a donee switch in accordance with a disclosed embodiment of the present invention.
Figure 4:
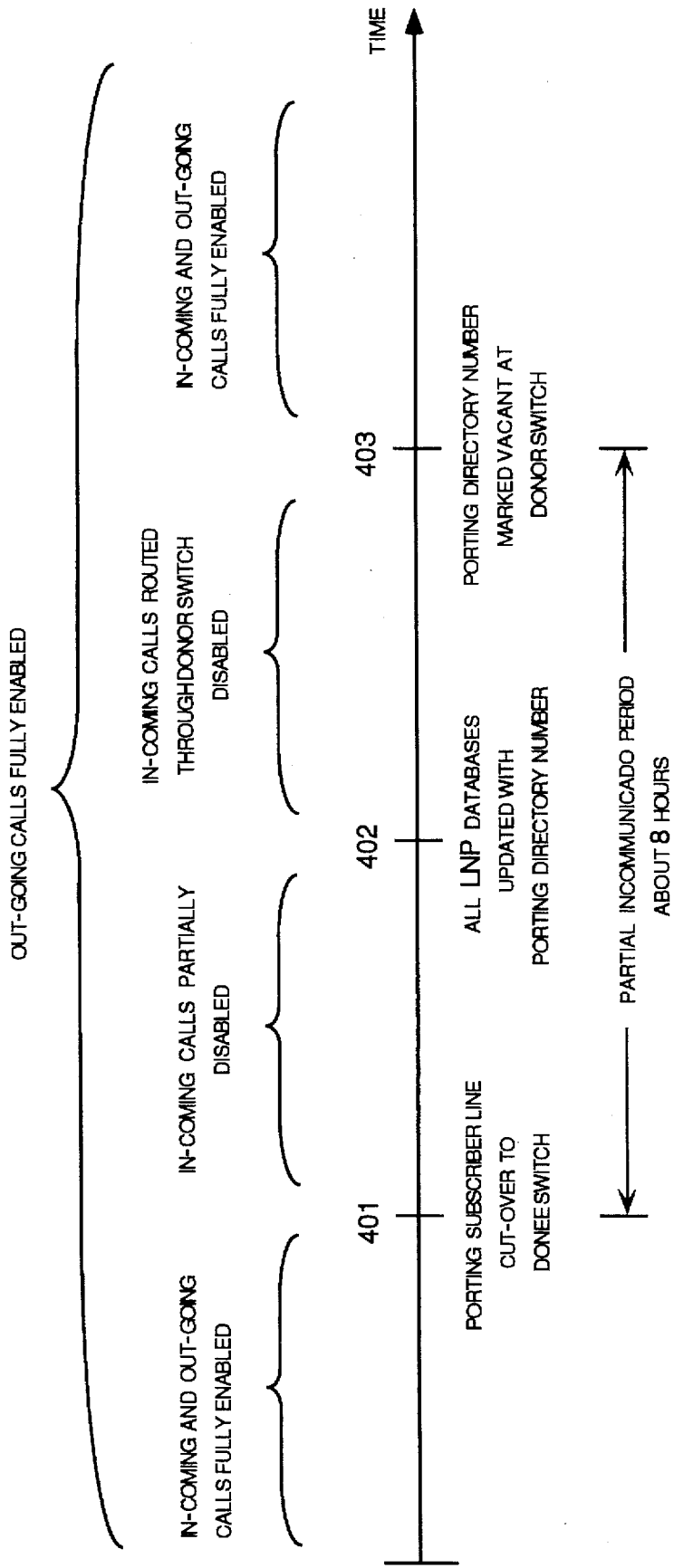
FIG. 4 is an event diagram that illustrates a first prior art sequence of events for implementing local number portability.
Figure 5:
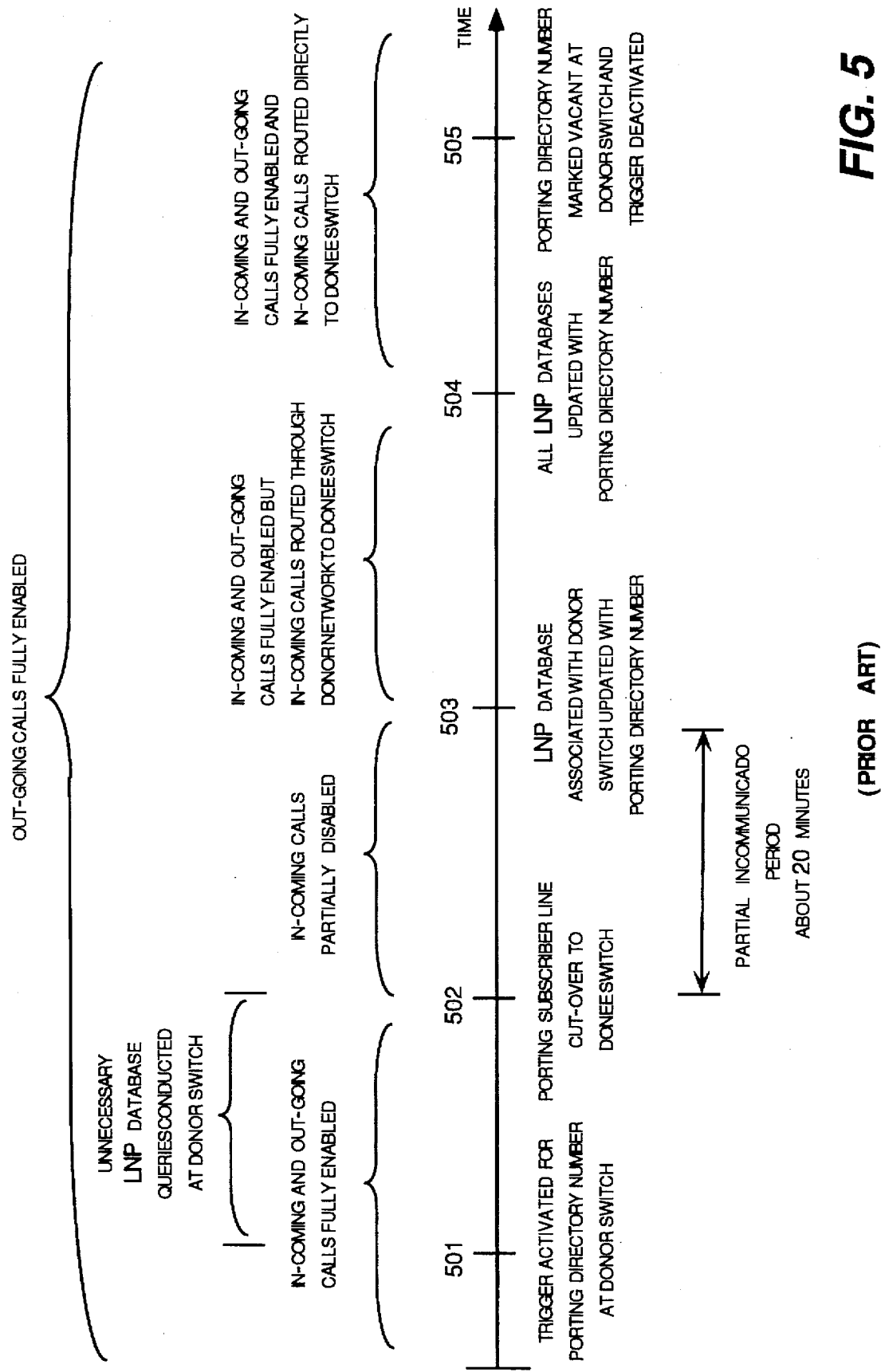
FIG. 5 is an event diagram that illustrates a second prior art sequence of events for implementing local number portability.

Referring now to the drawings, in which like numerals indicate like elements throughout the several figures, the preferred embodiments of the present invention will be described below with reference to the appended drawings. FIG. 1 illustrates an intelligent switched telecommunications network configured for local number portability, the operating environment for a disclosed embodiment of the present invention. FIGS. 2 and 3 illustrate the physical structures of a system for implementing local number portability. FIGS. 4 and 5 are event diagrams that illustrate two prior art methods for implementing local number portability. These prior art methods are described in detail to point out specific drawbacks associated with these methods, which drawbacks are overcome by the disclosed embodiment of the present invention. FIGS. 6–11 are event diagrams and logic flow diagrams that illustrate methods for implementing local number portability in accordance with the disclosed embodiment of the present invention shown in FIGS. 2 and 3.

The Operating Environment of the Preferred Embodiments

FIG. 1 is a functional block diagram that illustrates an intelligent switched telecommunications network configured for local number portability, the operating environment of a disclosed embodiment of the present invention. FIG. 1 illustrates a portion of a public switched telecommunications network (PSTN) 10 including an Advanced Intelligent Network (AIN) 11 of a typical local exchange carrier, which is well known to those skilled in the art. The AIN 11 is described in the commonly-owned patent to Weisser, Jr., U.S. Pat. No. 5,438,568, which is incorporated herein by reference.

The AIN 11 includes a plurality of central offices switches with some of the central office switches equipped with service switching points (SSPs). Representative SSPs 12a and 12b are shown in FIG. 1. An SSP is preferably equipped with AIN software release 0.1 or higher release. An SSP (specifically, a Class 5 central office switch) is the AIN component of a typical electronic central office switch used by a local exchange carrier. The terms "SSP" and "switch" are used interchangeably to refer to a telecommunications switch for connecting voice-channel circuits, including voice-channel lines, such as the voice-channel lines commonly designated as 14 with respect to the SSP 12a, and 17 with respect to the SSP 12b.

The switches of the AIN 11 are interconnected by a network of high capacity voice-channel circuits known as "trunks," which are commonly designated as 20 in FIG. 1. Trunks interconnect the central office switches to connect voice-channel communications. The term "communication" refers to include all messages or communications, including telephone calls, that may be exchanged between two pieces of terminating equipment. In FIG. 1, the terminating equipment is represented by telephones that are commonly designated as 16 with respect to the SSP 12a, and 18 with respect to the SSP 12b. Although telephones are illustrated as the pieces of terminating equipment, terminating equipment may include other communication devices, such as wireless telephones, facsimile machines, computers, modems, etc.

As discussed previously, each switch of the AIN 11 is operable for receiving a communication, such as a telephone call, originating on a line serviced by the switch, and for routing the telephone call to the correct terminating station. To illustrate, consider a telephone call from an originating station 16n to a terminating station 18n. The originating switch 12a initially receives the telephone call on the subscriber line 14n. The originating switch 12a then routes the telephone call to the terminating switch 12b, for example on the trunk 20a that connects the originating switch 12a to the terminating switch 12b. The terminating switch 12b further routes the telephone call on the subscriber line 17n for connection with the terminating station 18n. Other components of the AIN 11 illustrated in FIG. 1 may assist in this process, as described below.

Generally, the AIN 11 is operable for temporarily holding the telephone call at the originating switch 12a and determining whether the terminating station 18n is available before the telephone call is routed beyond the originating switch 12a. This aspect of the AIN 11 minimizes the trunk capacity required to handle telephone calls that cannot be connected. If the telephone call can be connected, the AIN 11 determines the most direct available communication path from the originating switch 12a to the terminating switch 12b. An efficient communication path, illustrated by the trunk 20a, is thus be identified before the telephone call is routed beyond the originating station 12n. The details of communication routing in accordance with the packet-switched protocol of the PSTN 10 are familiar to those skilled in the art and will not be further described herein. For more information regarding communication routing, see Bellcore Specification TR-NWT-001284 Switching Systems Generic Requirements for AIN 0.1, incorporated herein by reference.

It should be understood that the communication routing procedures described above may also involve one or more advanced network functions, such as call forwarding, calling line identification, prepaid or debit-card communication services, and the like. In fact, a wide variety of advanced network functions are presently available though the AIN 11. The ability of a typical SSP, such as the SSP 12a, to implement the required communication routing procedures and provide these advanced network functions is limited due to memory and other constraints. The AIN 11 therefore provides for increased information processing capability through a system of intelligent network elements that are functionally connected with the SSPs through a network of data links that are commonly designated as 22 in FIG. 1.

These intelligent network elements of the AIN 11 communicate with each other, and with the SSPs of the network, via digital data messages transmitted over the network of digital data links 22. Each switch in the AIN 11 is connected to a local signal transfer point (STP) via a data link. This arrangement is represented in FIG. 1 by the originating switch 12a, which is connected to the STP 24 by a data link 22a. The STP 24 is a multi-port, high-speed packet switch that is programmed to respond to the routing information and route the packet to its destination.

Much of the intelligence of the AIN 11 resides in a plurality of local service control points (SCPs), represented by an SCP 28, which is connected to the STP 24 by an SS7 data link 22c. An SCP, such as the SCP 28, is a remotely programmable intelligent network element. The SCP 28 is preferably equipped with AIN software release 0.1 or higher release. As is known to those skilled in the art, SCPs are physically implemented by relatively powerful fault tolerant computers. Among the functions performed by the SCPs is the maintenance of network databases that are used in providing subscribers with advanced network functions.

Additional devices for implementing advanced network functions within the AIN 11 are provided by a regional STP 32, a regional SCP 34, and a service management system (SMS) 40. The regional SCP 34 and the local SCP 28 are connected via respective data links 22g and 22h to the SMS 40. The local SCP 28 represents a plurality of local SCPs distributed throughout the AIN 11, and the regional SCP 34 represents a plurality of regional SCPs 34 distributed throughout the PSTN 10. The SMS 40 provides a centralized platform for remotely programming the various SCPs of the AIN 11 so that a coordinated information processing scheme may be implemented for the AIN 11. The SMS 40 is implemented by a large general purpose computer and interfaces to business offices of the local exchange carrier and interexchange carriers. The SMS 40 downloads information to the databases of the SCPs 28 and 34 when subscribers set up or modify their ensembles of AIN services. Similarly, the SMS 40 downloads, on a non-realtime basis, billing information to a billing system in order to appropriately invoice subscribers for the services provided.

An SSP may be configured to interface with the intelligent network elements of the AIN 11 through the use of a "trigger." In general, a trigger serves as an indicator for the SSP to take certain action. An SSP may be configured so that, when the SSP detects a predetermined set of conditions defining a trigger in association with a communication, the SSP creates an appropriate digital data message for transmission over the network of digital data links 22. The SSP typically suspends routing of the communication (i.e., holds the communication) until the SSP receives a reply to its message from an appropriate network element via the network of digital data links 22 instructing the SSP to take a certain action. If the SSP receives no instructions within a certain mount of time, the SSP "times-out" and executes a default task for the communication.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to mute the held communication for connection with a terminating station. A trigger may be activated or deactivated at an SSP by another network element through an "update" message. Query messages, conversation messages, response messages, and update messages are standard types of messages defined by the AIN protocol. The details of the AIN protocol are well known to those skilled in the art and will not be further described herein. For more information regarding the AIN protocol, see Bellcore Specification TR-NWT-001284 Switching Systems Generic Requirements for AIN 0.1, reference above.

A few additional points should be understood regarding the operating environment of the preferred embodiments. For the disclosed embodiment shown in FIG. 1, the originating switch 12a is an SSP. It is noted, however, that the AIN 11 may also include non-SSP central office switches (not shown). It will be appreciated that a non-SSP switch may initially receive a communication on a subscriber line and pass the communication to another switch, such as the SSP 12a, for further processing. Similarly, in a cellular or wireless network, a mobile switching office or other receiver/transmitter may initially receive a communication from a cellular telephone or wireless unit and route the communication to another network element, such as the SSP 12a, for further processing. In this manner, advanced network functions available through the AIN 11, such as those described herein, may be provided to wireless units and to subscriber lines that are directly connected to non-SSP switches.

In addition, as is well known to those skilled in the art, each switch of the AIN 11 may also include a tandem switch that interconnects local offices, SSPs, and interexchange switches. In particular, if an interoffice trunk or an interexchange mink to an SSP becomes unavailable or overloaded, an alternate communication path may be utilized so that telephone calls are processed through the tandem to reach the SSP. As alternate communication paths, the tandem switches include the same or similar equipment, and are generally provided with the same information available to their respective SSPs. It will therefore be appreciated that the present invention may be deployed in connection with an SSP, such as SSP 12a, as well as its tandem.

Finally, note that FIG. 1 illustrates a conventional land-line telecommunications system. For simplicity, the disclosed embodiment of the present invention is described in the context of this conventional land-line telecommunications system. It should be understood, however, that alternative embodiments of the present invention may operate in association with cellular or other wireless cellular telecommunications systems. In a conventional land-line telecommunications system, each subscriber is associated with a unique subscriber line. But in a cellular telecommunications system, each subscriber is not associated with a unique subscriber line. Rather, each subscriber is typically associated with a unique identification number, such as a directory number assigned to the subscriber's wireless unit. In a cellular telecommunications system, therefore, a porting subscriber line is not physically cut-over from a donor switch to a donee switch.

Thus, in a cellular telecommunications system, the equivalent of a physical line cut-over may simply be the "reassignment" of a porting subscriber directory number from a donor mobile telecommunications switching office (MTSO) to a donee MTSO. Typically, this reassignment will be associated with the transfer of certain responsibilities related to the porting subscriber from the donor cellular network to the donee cellular network. These responsibilities may include, for example, creating billing records for the porting subscriber, providing voice mail for the porting subscriber, providing call forwarding including "follow-me roaming" service for the porting subscriber, etc. It should therefore be understood that "reassignment" of a directory number refers to both a physical cut-over of a subscriber line from a donor switch to a donee switch, as in a land-line telecommunications system, as well as the transfer of certain responsibilities for a porting subscriber, as in a cellular telecommunications system.

Physical Structures of the Disclosed Embodiments

FIGS. 2 and 3 are functional block diagrams of an LNP enabled portion of the PSTN 10. This portion of the PSTN 10 is configured for local number portability in accordance with a disclosed embodiment of the present invention. FIGS. 2 and 3 illustrate an example in which a porting subscriber directory number is reassigned from the donor switch 12a to the donee switch 12b. FIG. 2 shows the PSTN 10 before the porting subscriber line 14a has been cut-over from the donor switch 12a to the donee switch 12b, and FIG. 3 shows the PSTN 10 after the porting subscriber line 14a has been cut-over. According to the disclosed embodiment of the present invention, an LNP activation telephone call is placed to an LNP Cut-Over Service (LCS) platform 50 following cut-over. The LCS platform 50 enables incoming telephone calls to the porting subscriber line 14a. The LCS platform 50 preferably completes the incoming telephone call enablement process during the LNP activation telephone call and provides an appropriate announcement prior to disconnection of the LNP activation telephone call.

Three interconnected AINs, 11a, 11b, and 11c, are shown to represent the LNP enabled portion PSTN 10. These AINs represent various networks of the PSTN 10 that are configured for local number portability. Of course, all of the networks of the PSTN 10 may not be AINs, and all of the networks of the PSTN 10 may not be configured for local number portability. But porting subscribers may port within the LNP enabled portion of the PSTN 10 and still direct telephone calls to, and receive telephone call from, subscribers connected to the non-LNP enabled portion of the PSTN 10. It will therefore be appreciated that the disclosed embodiment of the present invention illustrated in FIGS. 2 and 3 may be deployed on a local, regional, national, or international basis.

For the purposes of the example illustrated by FIGS. 2 and 3, the porting subscriber line 14a is assigned the directory number 404-222-2500. The AIN 11a represents the telecommunications system operated by the donor local telephone service provider, and the AIN 11b represents the telecommunications system operated by the donee local telephone service provider. The AIN 11c represents all of the other "third-party" AINs of the PSTN 10.

The donor AIN 11a includes the donor switch 12a. Prior to the implementation of local number portability, the 404-222 NPA-NXX was assigned exclusively to the donor switch 12a. Thus, prior to the implementation of local number portability, the porting subscriber line 14a, and every other subscriber line assigned a 404-222-XXXX directory number, was serviced by the donor switch 12a. The donor switch 12a is functionally connected with an SCP 28a, which is functionally connected with an SMS 40a. The SCP 28a includes an LNP database 42a, which includes a look-up table that cross-references ported directory numbers with donee switches throughout the LNP enabled portion of the PSTN 10. The AIN 11a also includes a dial-in LCS platform 50, which is functionally connected with the donor switch 12a, the SCP 28a, and the SMS 40a. The LCS platform 50 may be any type of platform configured to perform the described LCS functions, such as an SSP, SCP, services node, or a combination these network elements, as is well known to those skilled in the art.

The donee AIN 11b includes the donee switch 12b. The donee switch 12b is functionally connected with an SCP 28b, which is functionally connected with an SMS 40b. The SCP 28b includes an LNP database 42b, which includes a look-up table that cross-references ported directory numbers with donee switches throughout the LNP enabled portion of the PSTN 10. The AIN 11b could also include a dial-in LCS platform (not shown), which would be functionally connected with the donee switch 12b, the SCP 28b, and the SMS 40b.

The donee switch 12b is assigned an NPA-NXX 404-333, which may be used for porting subscriber directory numbers that have been reassigned to the donee switch 12b. As with any NPA-NXX, the 404-333 NPA-NXX is unique within the PSTN 10 such that no other switch is assigned the same NPA-NXX. Thus, the 404-333 NPA-NXX uniquely identifies the donee switch 12b for communication routing purposes. That is, the NPA-NXX (404-333) provides the routing information that is stored within the LNP database 42b to identify the donee switch 12b as the correct terminating switch for a telephone call directed to the porting subscriber directory number 404-222-2500. It should be understood that the NPA-NXX (404-333) so used by the LNP database 42b may be any NPA-NXX assigned to the donee switch 12b, and need not be a special NPA-NXX set aside for use in connection with porting subscriber directory numbers. Thus, the 404-333 NPA-NXX may also correspond to actual directory numbers assigned to subscriber lines that are serviced by the donee switch 12b.

The third-party AIN 11c includes an SSP 12c. The third-party switch 12c is functionally connected with an SCP 28c, which is functionally connected with an SMS 40c. The SCP 28c includes an LNP database 42c, which includes a look-up table that cross-references ported directory numbers with donee switches throughout the LNP enabled portion of the PSTN 10. The AIN 11c could also include a dial-in LCS platform (not shown), which would be functionally connected with the third-party switch 12c, the SCP 28c, and the SMS 40c.

The donor AIN 11a, the donee AIN 11c, and the third-party AIN 11c are functionally interconnected with each other via trunk circuits 20a, 20c, and 20d. These networks may be substantially identical, but they may also vary significantly in structure and operation. Indeed, flexibility is a salient attribute of the AIN architecture. Data and code for implementing advanced network functions may therefore be located in various intelligent network elements of AINs, with the SS7 network 20 providing the required communication links among the various network elements. For example, one of the AINs 11a, 11b, or 11c may not include an SSP equipped switch, an LNP SCP, an LCS platform, or an SMS. Another network element, such as an element of another AIN, may perform the functions of the omitted element as described herein. In this case, additional SS7 communication paths, or their equivalents, may be required.

To enable dial-in LNP activation for the porting subscriber, the donor switch 12a includes a previously provisioned but inactive directory-number-level trigger for the porting subscriber directory number (404-222-2500). Provisioning the trigger means programming the donor switch 12a with the data necessary to implement the trigger so that the only step required to activate the trigger is an activation command, such as a standard AIN update message. The trigger is provisioned in advance so that the LCS platform 50 can later activate the trigger in response to receiving an LNP activation telephone call.

In addition, the LNP database 42a includes a previously provisioned but inactive database entry associating the porting subscriber directory number (404-222-2500) with the NPA-NXX (404-333) assigned to the donee switch 12b. Provisioning the database entry means programming the LNP databases 42a with the data necessary to implement the database entry so that the only step required to activate the trigger is an activation command. As with the trigger, the LNP database entry is provisioned in advance so that the LCS platform 50 can later activate the LNP database entry in response to receiving an LNP activation telephone call.

The LNP databases 42a, 42b, and 42c are substantially identical, except that the timing of LNP programming may vary among the databases. In particular, each LNP database may include a different set of previously provisioned but inactive database entries. Each inactive database entry corresponds to a porting subscriber that has placed carrier change requests, but have not yet placed an LNP activation telephone call. The LNP database 42a includes inactive LNP database entries for porting subscriber lines serviced by the donor SSP 12a, the LNP database 42b includes inactive LNP database entries for porting subscriber lines serviced by the donee SSP 12a, and the LNP database 42c includes inactive LNP database entries for porting subscriber lines serviced by the donee SSP 12c.

Referring to FIG. 2, prior to cut-over of the porting subscriber line 14a, the LNP database 42a includes an inactive database entry for the porting subscriber directory number (404-222-2500). This entry associates the porting subscriber directory number 404-222-2500 with the NPA-NXX (404-333) of the donee switch 12b. The structure of the LNP database 42a prior to cut-over of the subscriber line 14a is shown in Table 1.

TABLE 1

| Porting Subscriber Directory Number | Donee Switch Identification Code | Active Flag |
|---|---|---|
| NPA-NXX-YYYY | NPA-NXX-ZZZZ | On |
| ... | ... | ... |
| 404-222-2500 | 404-333-2500 | Off |
| ... | ... | ... |
| NPA-NXX-YYYY | NPA-NXX-ZZZZ | On |

As shown in Table 1, for the purpose of describing this embodiment, each entry in the LNP database 42a includes three items, a porting subscriber directory number, a donee switch identification code, and an active flag. The porting subscriber directory number is the ten-digit directory number assigned to a porting subscriber line. The donee switch identification code is a ten-digit number that identifies the donee switch associated with the porting subscriber line. The first six digits of the donee switch identification code is the NPA-NXX assigned to the donee switch, which is represented by the first six digits of the term "NPA-NXX-ZZZ" in Table 1. In fact, the donee switch identification code could simply be the six digit NPA-NXX for the donee switch. But the donee switch identification code preferably includes four additional digits, represented by the digits "ZZZZ" in Table 1. This is because the SS7 signaling protocol is configured to handle ten-digit identification codes, and because the four additional digits allow the donee switch identification code to convey additional information for a particular porting subscriber.

For example, the four additional digits of the donee switch identification code may include the last four digits of the porting subscriber directory number, as shown in Table 1 with respect to the 404-333-2500 donee switch identification code associated with the porting subscriber directory number 404-222-2500. Alternatively, the four additional digits may be used to hold message codes related to the porting subscriber, such as status information (e.g., date of reassignment of directory number, date of transfer of billing responsibility, etc.), billing information (e.g., porting subscriber account current, porting subscriber account past due, etc.), and the like.

The active flag associated with an LNP database entry allows the entry to be effectively turned "on" or "off." When the active flag is off, the SCP 28a ignores the corresponding database entry and instructs the SSP 12a to route a held telephone call to the switch associated with the dialed NPA-NXX. Alternatively, when the active flag is on, the SCP 28a responds to the database entry by instructing the donor switch to route the telephone call to the donee switch (i.e., the switch assigned the NPA-NXX represented by the first six digits of the entry NPA-NXX-ZZZ in Table 1). Following cut-over of the subscriber line 14a to the donee switch 12b as shown in FIG. 3, the LCS platform 50 receives an LNP activation telephone call. The LCS platform 50 then enables incoming telephone calls to the porting subscriber line 14a by activating the previously provisioned but inactive database entry for the porting subscriber in the LNP database 42a. Thus, the structure of the LNP database 42a after the LNP activation telephone call for the subscriber line 14a is as shown in Table 2.

TABLE 2

| Porting Subscriber Directory Number | Donee Switch Identification Code | Active Flag |
|---|---|---|
| NPA-NXX-YYYY | NPA-NXX-ZZZZ | On |
| ... | ... | ... |
| 404-222-2500 | 404-333-2500 | On |
| ... | ... | ... |
| NPA-NXX-YYYY | NPA-NXX-ZZZZ | On |

Once the directory-number-level trigger for the porting subscriber directory number is activated, the donor switch 12a temporarily holds telephone calls received by the donor switch 12a that are directed to the porting subscriber directory number (404-222-2500). The donor switch 12a then sends a query message to the SCP 28a, which checks the LNP database 42a for an active database entry for the porting subscriber directory number (404-222-2500). If there is no entry in the LNP database 42a for the porting subscriber directory number (404-222-2500), or if the entry is inactive as shown in Table 1, then the SCP 28a instructs the donor switch 12a to route the telephone call to the porting subscriber line 14a by including the porting subscriber directory number in a response message transmitted to the donor switch 12a. If there is an entry in the LNP database 42a for the porting subscriber directory number (404-222-2500) as shown in Table 2, then the SCP 28a instructs the donor switch 12a to route the telephone call to the donee switch 12b by including the NPA-NXX (404-333) for the donee switch 12b in a response message transmitted to the donor switch 12a.

Those skilled in the art will appreciate that the donor switch 12a could equivalently be equipped with sufficient memory to contain the LNP database 42a. In this case, the directory-number-level trigger for the porting subscriber directory number at the donee switch 12a would be unnecessary. Rather, an inactive LNP database entry could be provisioned within the donee switch 12a itself, and the LCS platform 50 would activate the previously provisioned but inactive LNP database entry at the donee switch 12a. This may well be the preferred embodiment of present invention in the future, if future SSPs are manufactured to implement local number portability. But SSPs currently in use are not equipped with sufficient memory to implement local number portability. The disclosed embodiment therefore includes the LNP databases 42a, 42b, and 42c in the SCPs 28a, 28b, and 28c, respectively.

Because the LNP databases of the LNP enabled portion of the PSTN 10 must be continually updated with LNP data, the orderly dissemination of LNP data to the LNP databases throughout the PSTN 10 is a critical aspect of local number portability. The PSTN 10 therefore includes a multi-network SMS 52 to facilitate the dissemination of LNP data throughout the LNP enabled portion of the PSTN 10. The multi-network SMS 52 is functionally connected with the SMSs 40a, 40b, and 40c by way of the data links 54a, 54b, and 54c, respectively. The data links 54a, 54b, and 54c may be any of a variety of bi-directional links suitable for long-distance communications, such as X25, SS7, microwave, or the like.

The multi-network SMS 52 provides a centralized platform for programming the various AINs of the PSTN 10 for local number portability. As such, the multi-network SMS 52 may operate as a regional, national, or international clearing house for LNP data. A primary responsibility of the multi-network SMS 52 is to broadcast LNP data for porting subscribers to the various AINs so that the LNP databases located throughout the PSTN 10 may be kept up to date. It is anticipated that the multi-network SMS 52 will communicate only with the network SMSs 40a, 40b, and 40c, although some exceptions may occur.

As the clearing house for LNP data, multi-network SMS 52 should be advised of at least three types of LNP data. First, the multi-network SMS 52 should be advised whenever an NPA-NXX is declared portable. Declaring an NPA-NXX portable indicates that local number portability is enabled for the directory numbers within the NPA-NXX. Second, the multi-network SMS 52 should be advised, typically by receiving carrier change data, whenever a carrier change request is received for a particular porting subscriber. A carrier change request indicates that the subscriber line will soon be cut-over from a donor switch to a donee switch. Third, the multi-network SMS 52 should be advised, typically by receiving cut-over data, whenever cut-over actually occurs for a particular porting subscriber. These and other aspects of the operation of the multi-network SMS 52 are described with more particularity with respect to FIGS. 7 and 8 below.

To put the operation of the disclosed embodiment shown in FIGS. 2 and 3 in context, two prior art methods for implementing local number portability will be described first with reference to FIGS. 4 and 5. The shortcomings of these prior art methods for implementing local number portability will be pointed out to highlight the advantages of the disclosed embodiment. The operation of the disclosed embodiment will then be described in detail with reference to FIGS. 6 through 11.

Prior Art Methods for Implementing Local Number Portability

A first prior art method for implementing local number portability is illustrated by the event diagram of FIG. 4. Consider the example illustrated in FIGS. 2 and 3 in which the porting subscriber directory number (404-222-2500) is reassigned from the donor switch 12a to the donee switch 12b. Prior to event 401, and before the porting subscriber directory number may be reassigned, the associated NPA-NXX is declared portable. As noted previously, declaring an NPA-NXX portable indicates that local number portability is enabled for the directory numbers within the NPA-NXX.

In response to declaring the NPA-NXX (404-222) portable, the SSPs 12a, 12b, and 12c are programmed to implement local number portability for the NPA-NXX (404-222) by configuring each switch with a group-level trigger for the NPA-NXX (404-222), which group-level trigger is referred to as an "LNP trigger." It should be noted that a group-level trigger could be configured for any number of digits. A six-digit LNP trigger is preferred in the United States because an NPA-NXX includes six digits. Group-levels having a different number of digits may be preferred in other countries.

The LNP triggers cause the SSPs, such as the SSP 12c, to temporarily hold all telephone calls to directory numbers within the 404-222 NPA-NXX (i.e., all telephone calls in which the first six digits of the dialed directory number is 404-222). The SSP 12c then transmits an LNP query to the SCP 28c. The SCP 28c searches the LNP database 42c to determine whether the LNP database 42c includes an active LNP entry for the dialed directory number. If the LNP database 42c includes an active LNP entry for the dialed directory number, the SCP 28c instructs the SSP 12c to route the telephone call to the telephone call to the switch associated with the dialed NPA-NXX by including the dialed NPA-NXX in a response message transmitted to the SSP 12c. If there is an entry in the LNP database 42c for the dialed directory number, then the SCP 28c instructs the SSP 12c to route the telephone call to the appropriate donee switch by including the NPA-NXX (404-333) for the donee switch in a response message transmitted to the SSP 12c.

Note that an LNP trigger is a group-level trigger in that it operates on an NPA-NXX basis. That is, once the LNP trigger for the 404-222 NPA-NXX is activated at the SSP 12c, all telephone call received by the SSP 12c that are directed to a 404-222 directory number are held at the SSP 12c while a query is conducted of the LNP database 42c. A query is conducted even if dialed directory number is not actually a ported directory number. In fact, it is anticipated that most of the queries will be conducted for directory numbers that have not ported. But the queries will nevertheless be required for the purpose of determining whether the dialed directory number is a ported directory number.

LNP triggers work differently than other AIN group-level triggers in that a switch treats telephone calls directed to a portable NPA-NXX assigned to that switch differently that it treats telephone calls directed to a portable NPA-NXX assigned to another switch. Specifically, for telephone calls directed to its own portable NPA-NXX, the switch first checks its internal database to determine whether the dialed directory number is vacant. If the directory number is not vacant (i.e., the switch determines that it is currently servicing a subscriber line assigned to the dialed directory number), the switch does not launch an LNP query. Instead, to reduce the number of LNP database queries launched by the switch, the SSP only launches LNP queries for vacant directory numbers within an NPA-NXX assigned to the switch.

For example, referring to FIG. 2, consider a telephone call directed to the porting subscriber directory number (404-222-2500), originating anywhere in the PSTN 10, that is received by the donor switch 12a. The donor switch 12a first checks whether a dialed directory number corresponds to an NPA-NXX (404-222) assigned to the donor switch 12a, which it does. Because the dialed directory number corresponds to an NPA-NXX assigned to the SSP 12a, the SSP 12a checks its internal database to determine whether the dialed directory number is marked "vacant." As the dialed directory number is not marked vacant, because the subscriber line 14a is still serviced by the donor switch 12a, the donor switch 12a does not launch a query of the SCP 28a. Rather, the telephone call is routed to the subscriber line 14a without a query of the SCP 28a.

The communication routing procedures described above correspond to the time period preceding event 401 shown on FIG. 4. During this time period, incoming and out-going telephone calls are fully enabled to the porting subscriber line 14a by way of the donor switch 12a. At event 401, the porting subscriber line 14a is physically cut-over from the donor switch 12a to the donee switch 12b. After cut-over, out-going telephone calls are enabled via the porting subscriber line 14a by way of the donee switch 12b, but incoming telephone calls are partially disabled because LNP databases of the PSTN 10 have not yet been updated with the LNP data for the porting subscriber line 14a. For example, the third-party switch 12c routes telephone calls directed to the porting subscriber's telephone number to the donor switch 12a. Because the porting subscriber directory number is not yet marked vacant at the donor switch 12a, the donor switch 12a attempts to route the telephone call to the disconnected stub 19.

According to the first prior art method for implementing local number portability, incoming telephone calls are enabled by updating all of the LNP databases of the PSTN 10, represented by the LNP databases 42a, 42b, and 42c, with entries associating the porting subscriber directory number (404-222-2500) with the NPA-NXX (404-333) of the donee switch 12b. The completion of the LNP data dissemination process for the porting subscriber directory number (404-222-2500) is indicated as event 402 in FIG. 4. During the period of time between events 401 and 402, incoming telephone calls to the porting subscriber directory number (404-222-2500) are enabled, more or less, one LNP database at a time in an unpredictable manner. There may be no way for a porting subscriber to determine the status of incoming telephone call enablement at any particular point in time.

In addition, after event 402, incoming telephone calls directed to the porting subscriber directory number (404-222-2500) may still reach the donor switch 12a, such as telephone calls originating on lines serviced by the donor switch 12a. These incoming telephone calls are still disabled after event 402 because the porting subscriber directory number (404-222-2500) is not yet marked vacant at the donor switch 12a. Telephone calls originating on lines serviced by the donor switch 12a are not enabled until the porting subscriber directory number is marked vacant at the donor switch 12a at event 403. During the time period between events 401 and 403, the donor switch 12a attempts to route telephone call directed to the porting subscriber directory number (404-222-2500) to the disconnected stub 19 that was formerly the porting subscriber line 14a. Thus, according to the first prior art method for implementing local number portability, incoming telephone calls are not fully enabled until 403. A partial incommunicado period therefore subsists from event 401 until event 403. The partial incommunicado period could vary significantly from case to case, but is estimated to be about eight hours.

A second prior art method for implementing local number portability is illustrated by FIG. 5. This method reduces the partial incommunicado period to about twenty minutes. Prior to event 501, the PSTN 10 is configured as shown in FIG. 2, with the porting subscriber line 14a serviced by the donor switch 12a. During this period, incoming and outgoing telephone calls directed to the porting subscriber directory number (404-222-2500) are fully enabled through the donor switch 12a. In addition, the NPA-NXX (404-222) has been declared portable, and a six-digit LNP trigger for the NPA-NXX (404-222) has been programmed into each LNP enabled switch of the PSTN 10, represented by the SSPs 12a, 12b, and 12c.

At some time prior to event 501, a carrier change request is received for the porting subscriber directory number (404-222-2500). The carrier change request is preferably received several days prior to the scheduled cut-over date. At event 501, the donor switch 12a is programmed with a ten-digit directory-number-level trigger for the porting subscriber directory number (404-222-2500). The LNP database 42a, however, is not programmed with an entry associating the porting subscriber directory number (404-222-2500) with the NPA-NXX (404-333) of the donee switch 12b. This causes the donor switch 12a to continue to route telephone calls directed to the porting subscriber directory number (404-222-2500) to the porting subscriber line 14a. In other words, a telephone call directed to the porting subscriber directory number (404-222-2500) causes the LNP database 42a to be queried, but the query does not alter the routing of the telephone call because the LNP database 42a does not include a database entry associating the porting subscriber directory number (404-222-2500) with the NPA-NXX (404-333) of the donee switch 12b.

After event 501, the donor switch 12a will not route a telephone call directed to the porting subscriber directory number (404-222-2500) to the donee switch 12b until the LNP database 42a is programmed with an entry associating the porting subscriber directory number with the NPA-NXX (404-333) of the donee switch 12b. Of course, telephone calls directed to the porting subscriber directory number should not be routed to the donee switch 12b until the porting subscriber line 14a has been cut-over to the donee switch, as shown in FIG. 3. The porting subscriber line 14a is cut-over to the donee switch at event 502. Accordingly, the LNP database 42a is programmed with an entry associating the porting subscriber directory number (404-222-2500) with the NPA-NXX (404-333) of the donee switch 12b as soon as possible after event 502, at event 503.

It will be appreciated that following event 503, all incoming telephone calls directed to the porting subscriber directory number (404-222-2500), except those originating on a line serviced by the donee switch 12b, are routed to the donee switch 12b by way of the donor switch 12a. Although this is an inefficient telephone call routing procedure, it enables incoming telephone calls directed to the porting subscriber directory number (404-222-2500). Efficient telephone call routing procedure are enabled by updating all of the non-donor LNP databases of the PSTN 10, represented by the LNP databases 42b and 42c, with entries associating the porting subscriber directory number (404-222-2500) with the NPA-NXX (404-333) of the donee switch 12b.

The LNP databases 42b and 42c are therefore updated with entries associating the porting subscriber directory number (404-222-2500) with the NPA-NXX (404-333) of the donee switch 12b. The completion of the LNP programming process for the porting subscriber directory number (404-222-2500) is indicated as event 504 in FIG. 5. Following event 504, incoming telephone calls directed to the porting subscriber directory number are efficiently routed directly to the donee switch 12b. At event 505, the porting subscriber directory number is marked vacant at the donor switch 12a, and the directory-number-level trigger for the porting subscriber directory number at the donor switch 12a is deactivated. Event 505 marks the completion of the second prior art method for implementing local number portability for the porting subscriber directory number.

Compared to the first prior art method for implementing local number portability, the second prior art method for implementing local number portability reduces the partial incommunicado period (event 502 until event 503) from a period estimated to be about eight hours, to a period estimated to be less than an hour—perhaps about twenty minutes. This reduction in the partial incommunicado period results from the advance activation of the ten-digit directory-number-level trigger for the porting subscriber directory number at the donor switch 12a. A drawback of the second prior art method for implementing local number portability is that unnecessary LNP database queries are conducted prior to cut-over of the subscriber line 14a to the donee switch 12b (event 501 until event 502). Another drawback is that a partial incommunicado period estimated to be about twenty minute still persists.

It should be understood that the preceding estimates of the durations of the partial incommunicado periods associated with the first and second prior art methods for implementing local number portability are the inventors' best estimates based on the information currently available to the inventors. But the inventors have not physically implemented either the first or second prior art methods for implementing local number portability and, therefore, have not had the opportunity to measure the durations of actual partial incommunicado periods. In addition, the durations of actual partial incommunicado periods would vary significantly from network to network, and from porting subscriber to porting subscriber within a particular network.

Implementation Of Local Number Portability In Accordance With a Disclosed Embodiment of the Present Invention FIG. 6 is an event diagram that illustrates a sequence of events for implementing local number portability in accordance with the disclosed embodiment of the present invention illustrated in FIGS. 2 and 3. This method for implementing local number portability overcomes the above-described shortcomings of the first and second prior art methods for implementing local number portability. In particular, the disclosed embodiment provides a dial-in LCS platform 50 for receiving LNP activation telephone calls. For example, the LCS platform 50 allows an authorized party to automatically enable incoming telephone calls directed to the porting subscriber directory number (404-222-2500) at any time after the porting subscriber line 14a is cut-over to the donee switch 12b, as shown in FIG. 3.

Prior to event 601, the PSTN 10 is configured as shown in FIG. 2, with the porting subscriber line 14a serviced by the donor switch 12a. During this period, incoming and out-going telephone calls directed to the porting subscriber directory number (404-222-2500) are fully enabled through the donor switch 12a. In addition, the NPA-NXX (404-222) has been declared portable, and a six-digit LNP trigger for the NPA-NXX (404-222) has been programmed into each LNP enabled switch of the PSTN 10, represented by the SSPs 12a, 12b, and 12c.

At some time prior to event 601, a carrier change request is received for the porting subscriber directory number (404-222-2500). The carrier change request is preferably received several days prior to the scheduled cut-over date. At event 601, the donor switch 12a is provisioned with an inactive ten-digit directory-number-level trigger for the porting subscriber directory number (404-222-2500). At event 602, the LNP database 42a is provisioned with an inactive entry associating the porting subscriber directory number (404-222-2500) with the NPA-NXX of the donee switch 12b (404-333), as shown in Table 1. The relative timing of events 601 and 602 is not important, either event may be performed first.

At event 603, the subscriber line 14a is physically cut-over to the donee switch 12b, as shown in FIG. 3. Immediately following event 603, incoming telephone calls directed to the porting subscriber directory number (404-222-2500) are generally disabled. It is noted that incoming telephone calls originating on a subscriber line serviced by the donee switch 12b may be immediately enabled by pre-programming the donee switch 12b to route these telephone calls to the porting subscriber line 14a. Incoming telephone calls originating on all other switches, however, are initially disabled. But they are only disabled until an authorized person places an LNP activation telephone call to the LCS platform 50, which occurs at event 604. In response to the LNP activation telephone call, the LCS platform 50 activates the previously provisioned but inactive directory-number-level trigger for the porting subscriber directory number (404-222-2500) at the donor switch 12b. The LCS platform 50 also activates the previously provisioned but inactive entry in the LNP database 42a associating the porting subscriber directory number (404-222-2500) with the NPA-NXX (404-333) of the donee switch 12b, as shown in Table 2.

Following event 604, all incoming telephone calls directed to the porting subscriber directory number (404-222-2500), except those originating on a line serviced by the donee switch 12b, are muted to the donee switch 12b by way of the donor switch 12a. Although this is an inefficient telephone call routing procedure, it enables incoming telephone calls directed to the porting subscriber directory number (404-222-2500). Efficient telephone call routing procedures are enabled by updating all of the other LNP databases of the PSTN 10, represented by the LNP databases 42b and 42c, with entries associating the porting subscriber directory number (404-222-2500) with the NPA-NXX (404-333) of the donee switch 12b.

To enable efficient telephone call muting procedures, the multi-network SMS 52 broadcasts a notification to the SMSs 40b and 40c indicating that the porting subscriber directory number (404-222-2500) has been reassigned to the donee switch 12b. The broadcast includes the porting subscriber directory number (404-222-2500) and the NPA-NXX (404-333) assigned to the donee switch 12b. The SMSs 40b and 40c then transmit messages to the SCPs 28b and 28c, respectively, that cause the LNP databases 42b and 42e, respectively, to be updated with entries associating the porting subscriber directory number (404-222-2500) with the NPA-NXX (404-333) of the donee switch 12b.

The completion of the LNP programming process for the porting subscriber directory number (404-222-2500) is indicated as event 605 in FIG. 6. Following event 605, incoming telephone calls directed to the porting subscriber directory number are efficiently routed directly from the third-party switch 12c to the donee switch 12b. At event 606, the porting subscriber directory number is marked vacant at the donor switch 12a, and the directory-number-level trigger for the porting subscriber directory number at the donor switch 12a is deactivated. Event 606 marks the completion of the disclosed method for implementing local number portability in accordance with the system shown in FIGS. 2 and 3.

It should be understood that events 601 and 602 do not effect the routing of telephone calls directed to the porting subscriber directory number (404-222-2500). The donor switch 12a continues to route telephone calls directed to the porting subscriber directory number (404-222-2500) to the porting subscriber line 14a until the directory-number-level trigger and the LNP database entry are activated. Moreover, the donor switch 12a does so without launching unnecessary queries of the LNP database 42a. The inactive directory-number-level trigger and LNP database entry are provisioned in advance of cut-over (event 603) so that they may be easily activated after cut-over with an LNP activation telephone call to the LCS platform 50 (event 604). The disclosed embodiment thus overcomes the drawbacks of the prior art methods for implementing local number portability. Specifically, the inactive directory-number-level trigger overcomes the problem of a partial incommunicado period, and the inactive LNP database entry overcomes the problem of unnecessary LNP database queries prior to cut-over.

Figure 7A:
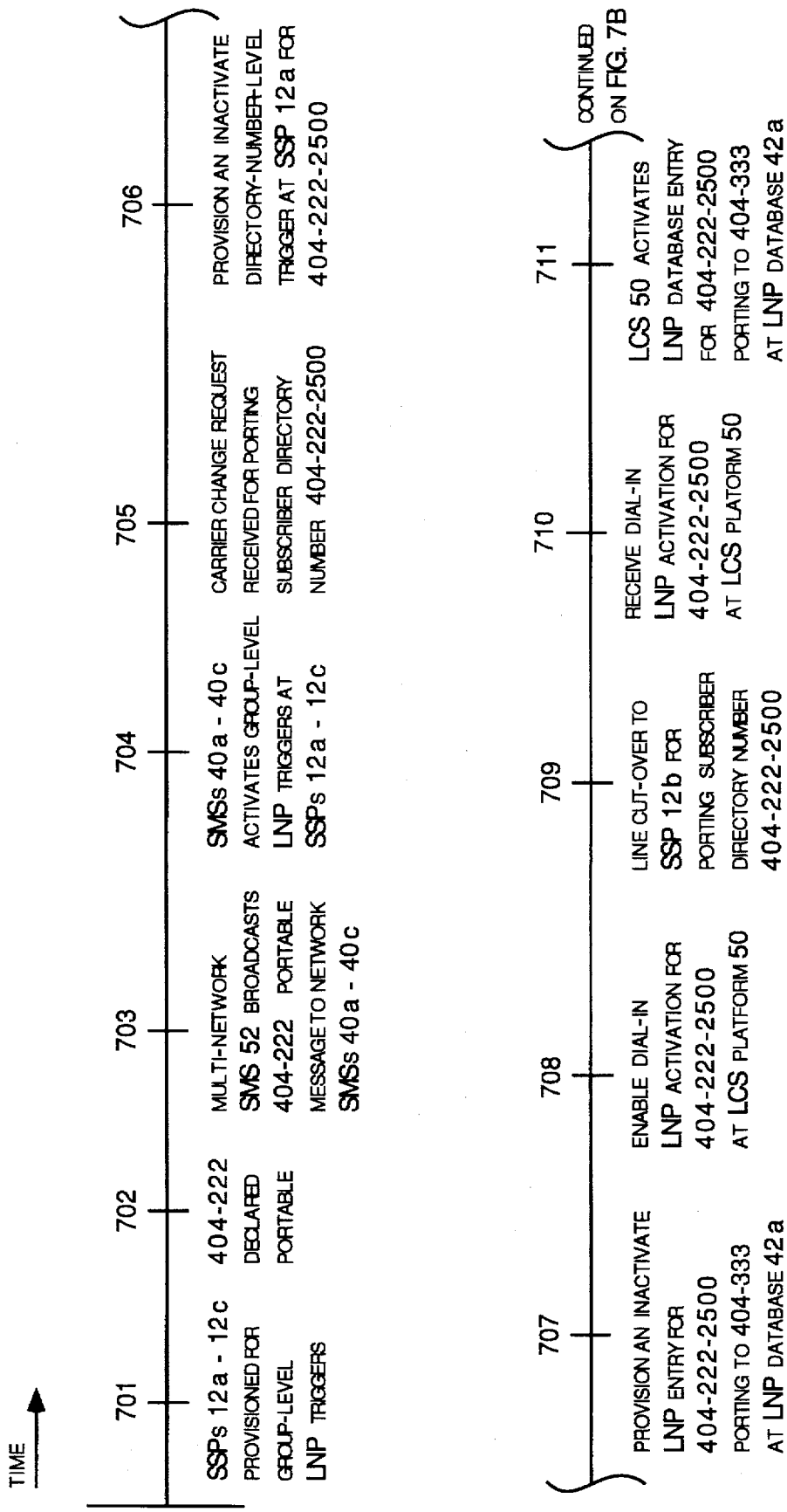
FIGS. 7A and 7B, is an event diagram that illustrates with more particularity a sequence of events for implementing local number portability in accordance with a disclosed embodiment of the present invention.
Figure 7B:
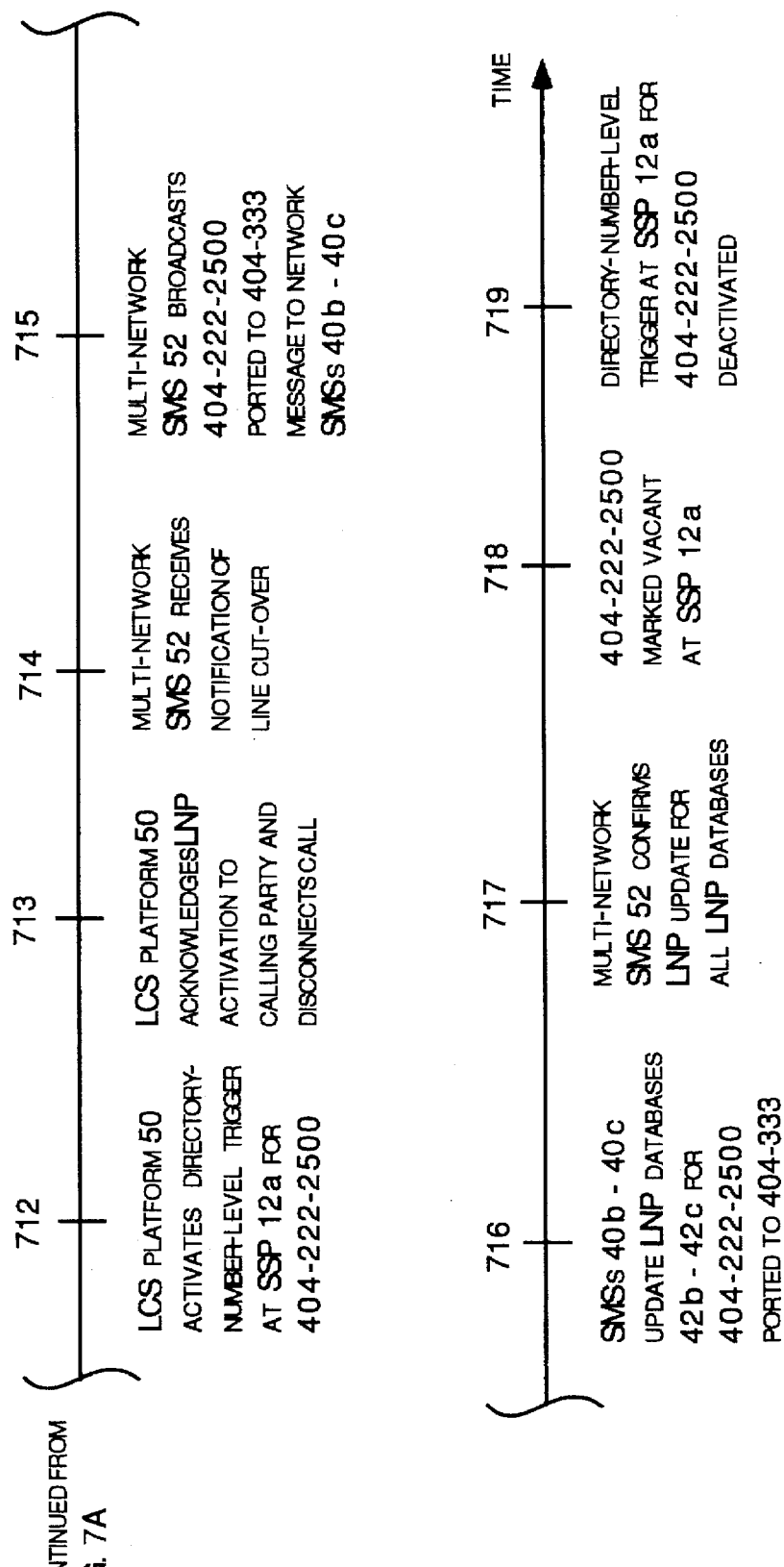

FIG. 7 is an event diagram that illustrates with more particularity a sequence of events for implementing local number portability in accordance with the disclosed embodiment of the present invention illustrated in FIGS. 2 and 3. In particular, FIG. 7 is an event diagram illustrating the interaction of the physical structures of the system shown in FIGS. 2 and 3 in implementing local number portability for the porting subscriber directory number (404-222-2500) assigned to the porting subscriber line 14a, which is cut-over from the donor switch 12a to the donee switch 12b. The event diagram begins on FIG. 7A and caries over to FIG. 7B.

Starting with FIG. 7A, at event 701 the SSPs 12a, 12b, and 12c are provisioned for six-digit LNP triggers generally. At event 702, the 404-222 NPA-NXX is declared portable. The multi-network SMS 52 is advised that the 404-222 NPA-NXX has been declared portable, and at event 703, the multi-network SMS 52 broadcasts a message to the SMSs 40a, 40b, and 40c indicating that the 404-222 NPA-NXX has been declared portable. At event 704, the SMSs 40a, 40b, and 40c update the SSPs 12a, 12b, and 12c, respectively, to include six-digit LNP triggers for the 404-222 NPA-NXX. Any of the directory numbers of the 404-222 NPA-NXX may now port to another switch within the LNP enabled portion of the PSTN 10.

At some time after the 404-222 NPA-NXX has been declared portable, at event 705, the multi-network SMS 52 receives a carrier change request for the porting subscriber directory number (404-222-2500). At event 706, the multi-network SMS 52 responds to the carrier change request by issuing a work order that causes the donor switch 12a to be provisioned with an inactive directory-number-level trigger for the porting subscriber directory number (404-222-2500). At event 707, the multi-network SMS 52 transmits a message to the SMS 40a that causes an inactive database entry for the porting subscriber directory number to be provisioned in the LNP database 42a, as shown above in Table 1.

At event 708, the multi-network SMS 52 transmits the porting subscriber directory number (404-222-2500) and the NPA-NXX (404-333) assigned to the donee switch 12b to the LCS platform 50. The multi-network SMS 52 also generates an authorization code and transmits the authorization code to the LCS platform 50. In some manner, such as confirmation by mail, the authorization code is also provided to the porting subscriber or to a person authorized by the porting subscriber to cut-over the subscriber line 14a. The authorization codes is a security measure to prevent "slamming," the unauthorized reassignment of a subscriber directory number. The LCS platform 50 therefore requires a party placing an LNP authorization telephone call to input the authorization code.

Next, at event 709, the subscriber line 14a is physically cut-over from the donor switch 12a to the donee switch 12b, as shown in FIG. 3. An authorized person then places an LNP authorization telephone call to the LCS platform 50 at event 710. The LCS platform 50 verifies authorization and asks the calling party to hold while incoming telephone calls are enabled. At event 711, the LCS platform 50 activates the previously provisioned but inactive LNP database entry for the porting subscriber directory number at the LNP database 42a. This concludes the portion of the event diagram illustrated on FIG. 7A.

Referring now to FIG. 7B, at event 712, the LCS platform 50 activates the previously provisioned but inactive directory-number-level trigger for the porting subscriber directory number at the donor switch 12a. At event 713, the LCS platform 50 plays an announcement to the calling party indicating the incoming telephone calls are fully enabled, and disconnects the LNP activation telephone call. Following event 713, incoming telephone calls to the porting subscriber line 14a are fully enabled. But all incoming telephone calls, except those originating on a line serviced by the donee switch 12b, are inefficiently routed to the donee switch 12b by way of the donor switch 12a. This situation can be rectified by updating all of the other LNP databases of the PSTN 10, represented by the LNP databases 42b and 42c, with entries associating the porting subscriber directory number (404-222-2500) with the NPA-NXX (404-333) of the donee switch 12b.

Accordingly, at event 714, the LCS platform 50 notifies the multi-network SMS 52 of the reassignment of the porting subscriber directory number to the donee switch 12b. The multi-network SMS 52, at event 715, broadcasts a notification to SMSs 40b and 40c indicating that the porting subscriber directory number (404-222-2500) is now associated with the NPA-NXX (404-333) assigned to the donee switch 14b. At event 716, the SMSs 40b and 40c transmit messages to the SCPs 28b and 28c, respectively, that cause the LNP databases 42b and 42c, respectively, to be updated accordingly.

As noted previously, the AINs 11b and 11c represent all of the LNP enabled AINs of the PSTN 10, which could number in the dozens or more. It is possible that one or more of the AINs might not receive the initial broadcast from the multi-network SMS 52. Therefore, at event 717, the multi-network SMS 52 confirms the update of the LNP databases 42b and 42c, and resends the broadcast as required. Thus, efficient routing is realized as the LNP data for the porting subscriber is disseminated throughout the PSTN 10. This process could take a few minutes, hours, or even days.

During the LNP activation telephone call, or shortly thereafter, the LCS platform 50 notifies the SMS 40a that the subscriber line has been cut-over to the donee switch 12b. The SMS 40a, at event 718, issues a work order that causes the porting subscriber directory number to be marked vacant at the donee switch 12a. The work order is typically filled within two to five working days. Once the porting subscriber directory number is marked vacant, the ten-digit directory-number-level trigger for the porting subscriber directory number is deactivated at the donee switch 12a at event 719. Specifically, a standard update message may be transmitted from the SMS 40a to the SCP 28a, and from the SCP 28a to the donee switch 12a, to deactivate the directory-number-level trigger for the porting subscriber directory number at the donee switch 12a. The LNP programming process for the porting subscriber directory number (404-222-2500) is now complete.

Figure 8:
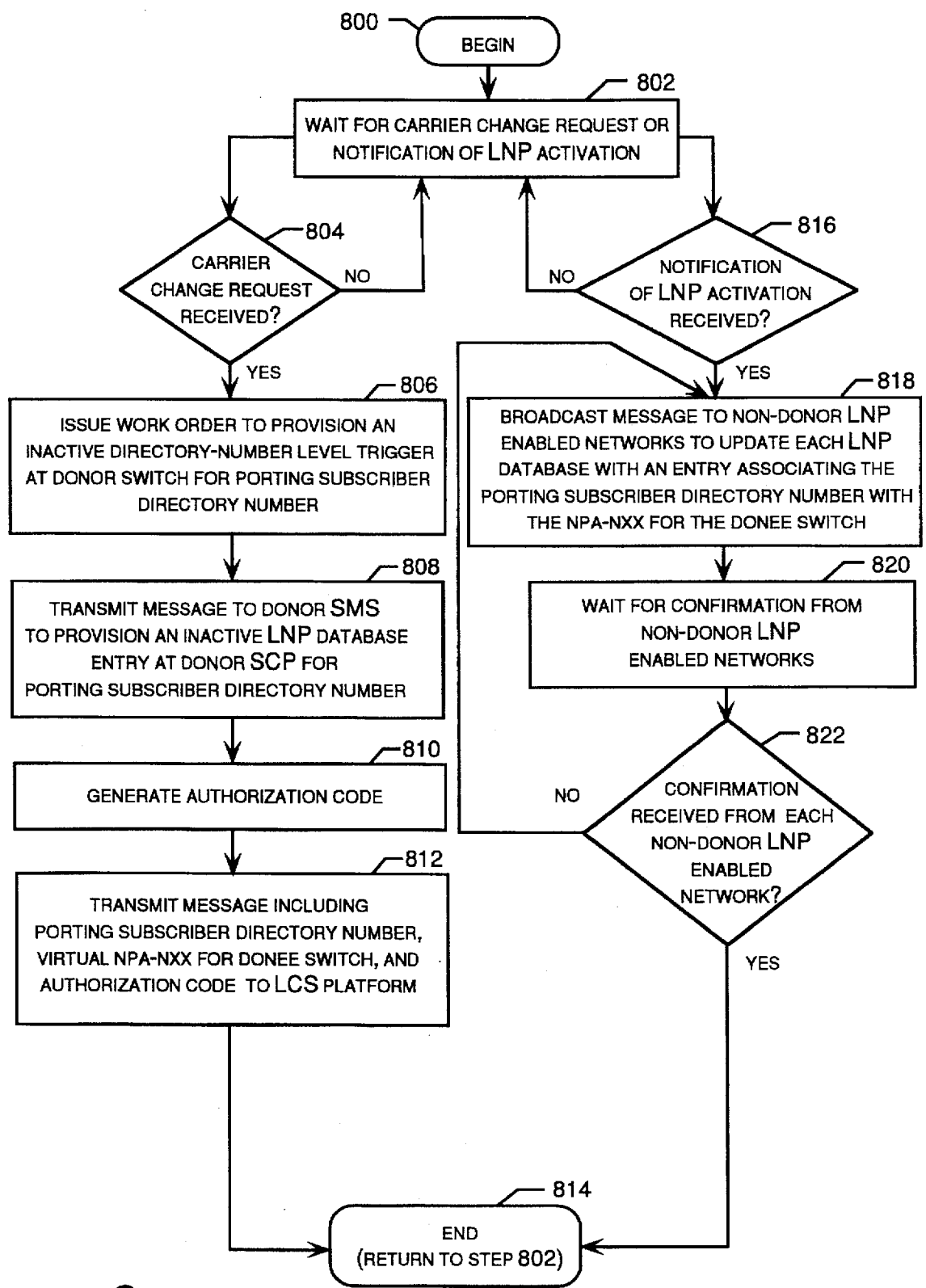
FIG. 8 is a logic flow diagram that illustrates a preferred method for operating a multi-network service management system in accordance with a disclosed embodiment of the present invention.

Logic Flow Diagrams Illustrating the Operating Methods of the Network Elements of the Disclosed Embodiment The following logic flow diagrams will be described in the context of the example illustrated in FIGS. 2 and 3, in which the porting subscriber directory number (404-222-2500) is reassigned from the donor switch 12a to the donee switch 12b. FIG. 8 is a logic flow diagram that illustrates a computer-implemented process for operating the multi-network SMS 52 in accordance with a disclosed embodiment of the present invention. The method begins in step 800, and in step 802 the multi-network SMS 52 waits for a carrier change request or a notification of LNP activation for a porting subscriber directory number. A carrier change request is typically received through a telephone call or a computer communication, such as an e-mail message, from a porting subscriber or from a party authorized by a porting subscriber. Notification of LNP activation, on the other hand, is preferably received from the LCS platform 50. Step 802 may be followed by a first branch beginning with step 804, or by a second branch beginning with step 816.

Turning to the first branch from step 802, this step may be followed by decision step 804, in which the multi-network SMS 52 determines whether it has received a carrier change request for the porting subscriber directory number (404-222-2500). If the multi-network SMS 52 has not received a carrier change request, the "NO" branch is followed from step 804 back to step 802. If the multi-network SMS 52 has received a carrier change request, the "YES" branch is followed from step 804 to step 806. In step 806, the multi-network SMS 52 issues a work order that causes an inactive directory number level trigger to be provisioned at the SCP 12a for the porting subscribers directory number (404-222-2500). Step 806 is followed by step 808, in which the multi-network SMS 52 transmits a message to the donor SMS 40a that causes the SMS 40a to provision an inactive LNP database entry associating the porting subscriber directory number (404-222-2500) with the NPA-NXX (404-333) for the donee switch 12b. This inactive LNP database entry is provisioned in the LNP database 42a of the SCP 28a.

In step 810, the multi-network SMS 52 generates an authorization code. In step 812, the authorization code, along with the porting subscriber directory number (404-222-2500) and the NPA-NXX (404-333) for the donee switch 12b, are transmitted to the LCS platform 50. Step 812 is followed by the "END" step, which returns to step 802, in which the multi-network SMS 52 waits for a notification of LNP activation for a porting subscriber directory number.

Turning to the second branch from step 802, this step may also be followed by decision step 816, in which the multi-network SMS 52 determines whether it has received a notification of LNP activation for the porting subscriber directory number (404-222-2500). If the answer to inquiry of step 816 is no, the "NO" branch is followed from step 816 back to step 802. If the multi-network SMS 52 has received a notification of LNP activation for the porting subscriber directory number (404-222-2500), the "YES" branch is followed from step 816 to step 818. In step 818, the multi-network SMS 52 broadcasts a message to all of the non-donor LNP enabled networks of the PSTN 10, which are represented by the AINs 11b and 11c. This message instructs the AINs 11b and 11c to update the LNP databases 42b and 42c, respectively, with active LNP database entries associating the porting subscriber directory number (404-222-2500) with the NPA-NXX (404-333) of the donee switch 12b. It should be understood that the SMS 40a might also update other LNP databases (not shown) within the donor network 11a, such as those associated with non-donor switches (not shown) within the donor network 11a. It should also be understood that in an alternative embodiment, the donee switch could be a non-donor switch within the donor network 11a.

Step 818 is followed by step 820, in which the multi-network SMS 52 waits for confirmation of the LNP update for the porting subscriber directory number (404-222-2500) from the AINs 11b and 11c. In step 822, the multi-network SMS 52 determines whether a confirmation has been received from each of the AINs 11b and 11c. If the answer to the inquiry of step 822 is no, the "NO" branch is followed back to step 818, in which the multi-network-network SMS 52 broadcasts another message, this time only to the non-confirming AIN(s). If the answer to the inquiry of step 822 is yes, the "YES" branch is followed from step 822 to the "END" step 814, which returns to step 802, and the computer-implemented process illustrated by FIG. 8 is concluded.

Figure 9:
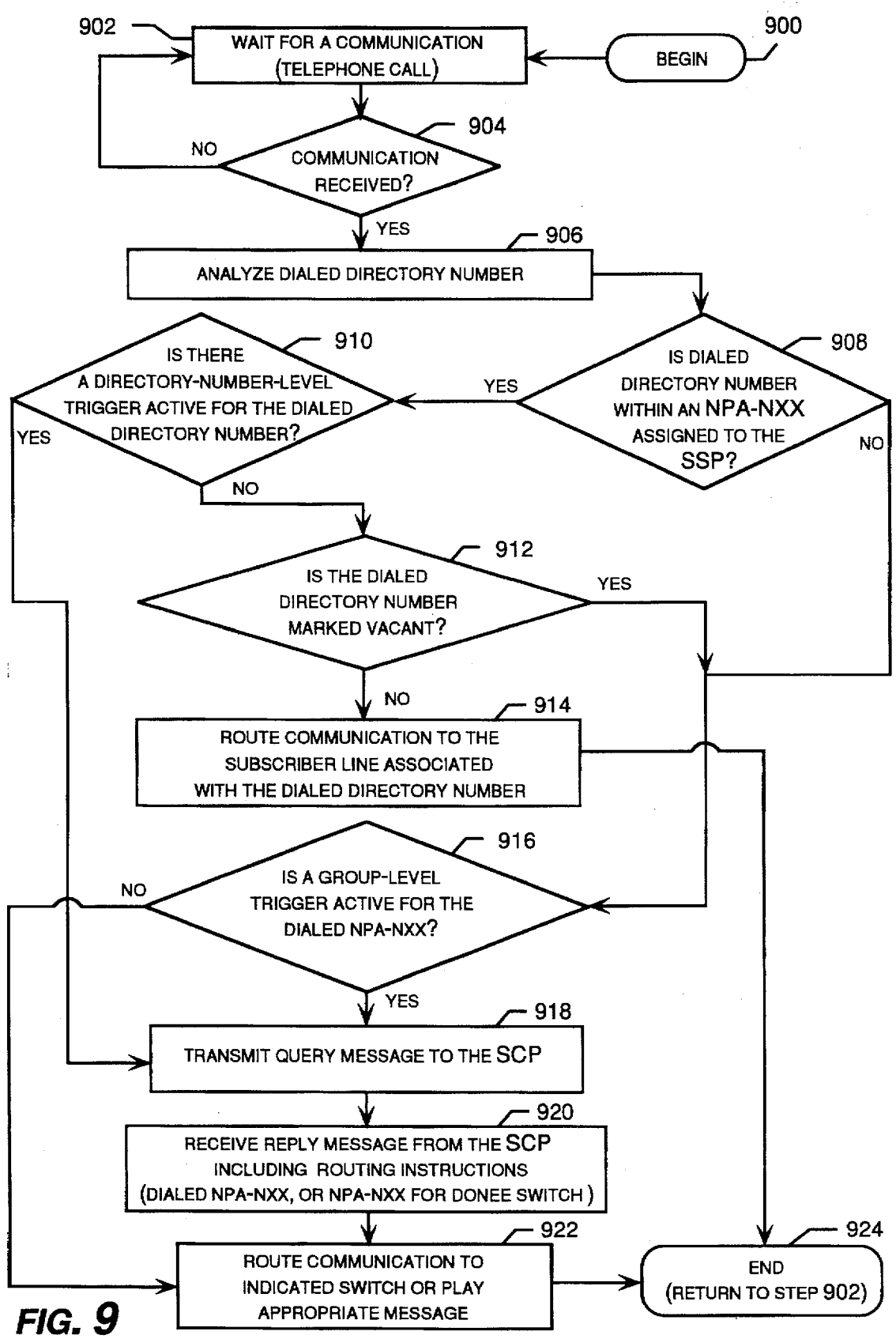
FIG. 9 is a logic flow diagram that illustrates a computer-implemented process for operating a service switching point in accordance with a disclosed embodiment of the present invention.

FIG. 9 is a logic flow diagram that illustrates a computer-implemented process for operating a service switching point, such as the SSPs 12a, 12b, and 12c (FIGS. 2 and 3), in accordance with a disclosed embodiment of the present invention. For this example, the SSP 12c will be used to illustrate the computer-implemented process of FIG. 9. The process begins at 900, and at step 902 the SSP 12c waits for a communication, typically a telephone call. In step 904, the SSP 12c determines whether a communication has been received. If a communication has not been received, the "NO" branch is followed from step 904 back to step 902, in which the SSP 12c waits for a communication. If a communication has been received, the "YES" branch is followed from step 904 to step 906, in which the SSP 12c analyzes the dialed directory number, which for this example is the porting subscriber directory number (404-222-2500).

Step 906 is followed by step 908, in which the SSP 12c determines whether the dialed directory number is within an NPA-NXX assigned to the SSP 12c. For this example, the 404-222 NPA-NXX is not assigned to the SSP 12c, but for the sake of completeness the steps that would be followed if the 404-222 NPA-NXX was assigned to the SSP 12c will be described. If the answer to the inquiry of step 908 is yes, the "YES" branch is followed from step 908 to step 910, in which the SSP 12c determines whether a directory-number-level trigger is active for the dialed directory number. If the answer to the inquiry of step 910 is no, the "NO" branch is followed from step 910 to step 912, in which the SCP 12c determines whether the dialed directory number is vacant. If the dialed directory number is vacant, the "NO" branch is followed from step 912 to step 914, in which the SSP 12c routes the communication to the subscriber line associated with the dialed directory number. Step 914 is followed by the "END" branch, which returns to step 902.

Referring again to step 908, if the dialed directory number is not within an NPA-NXX assigned to the SSP 12c (for this example it is not), the "NO" branch is followed from step 908 to step 916. The "YES" branch from step 912 is also followed by step 916, which branch is followed if the dialed directory number is marked vacant at the donor SSP 12c. In step 916, the SSP 12c determines whether a group-level trigger (e.g., a six-digit LNP trigger) is active for the dialed NPA-NXX (404-222). If the answer to the inquiry of step 916 is no, the "NO" branch is followed from step 916 to step 922. In step 922, the SSP 12c routes the communication to the switch associated with the dialed NPA-NXX, or, if the dialed NPA-NXX is invalid, an appropriate message is played to the calling party. Step 922 is followed by the "END" step 924, which returns to step 902.

Referring again to step 910, if a directory-number-level trigger for the dialed directory number is active at the SSP 12c, the "YES" branch is followed from step 910 to step 918. Step 918 also follows the "NO" branch from step 916. In step 918, the SSP 12c transmits a query message to the SCP 28c. The SCP 28c determines whether there is an active entry corresponding to the dialed directory number (404-222-2500) in the LNP database 42c. If there is an active LNP database entry for the dialed directory number, the SCP 28c includes the NPA-NXX (404-333) for the dialed directory number in a response message that is transmitted to the SSP 12c. The operation of the SCP 28c is described with more particularity with respect to FIG. 10 below.

Step 918 is followed by step 920, in which the SSP 12c receives a response message from its associated SCP 12c. The response message includes routing instructions in the form of an NPA-NXX, as described above. Step 920 is followed by step 922, in which the SSP 12c routes the communication to the indicated switch or, if the NPA-NXX is invalid, plays an appropriate message to the calling party, such as the familiar announcement, "the number you have reached, 404-222-2500, is not is service." Step 922 is followed by the "END" step 924, which returns to step 902, and the computer-implemented process illustrated by FIG. 9 is concluded.

Figure 10:
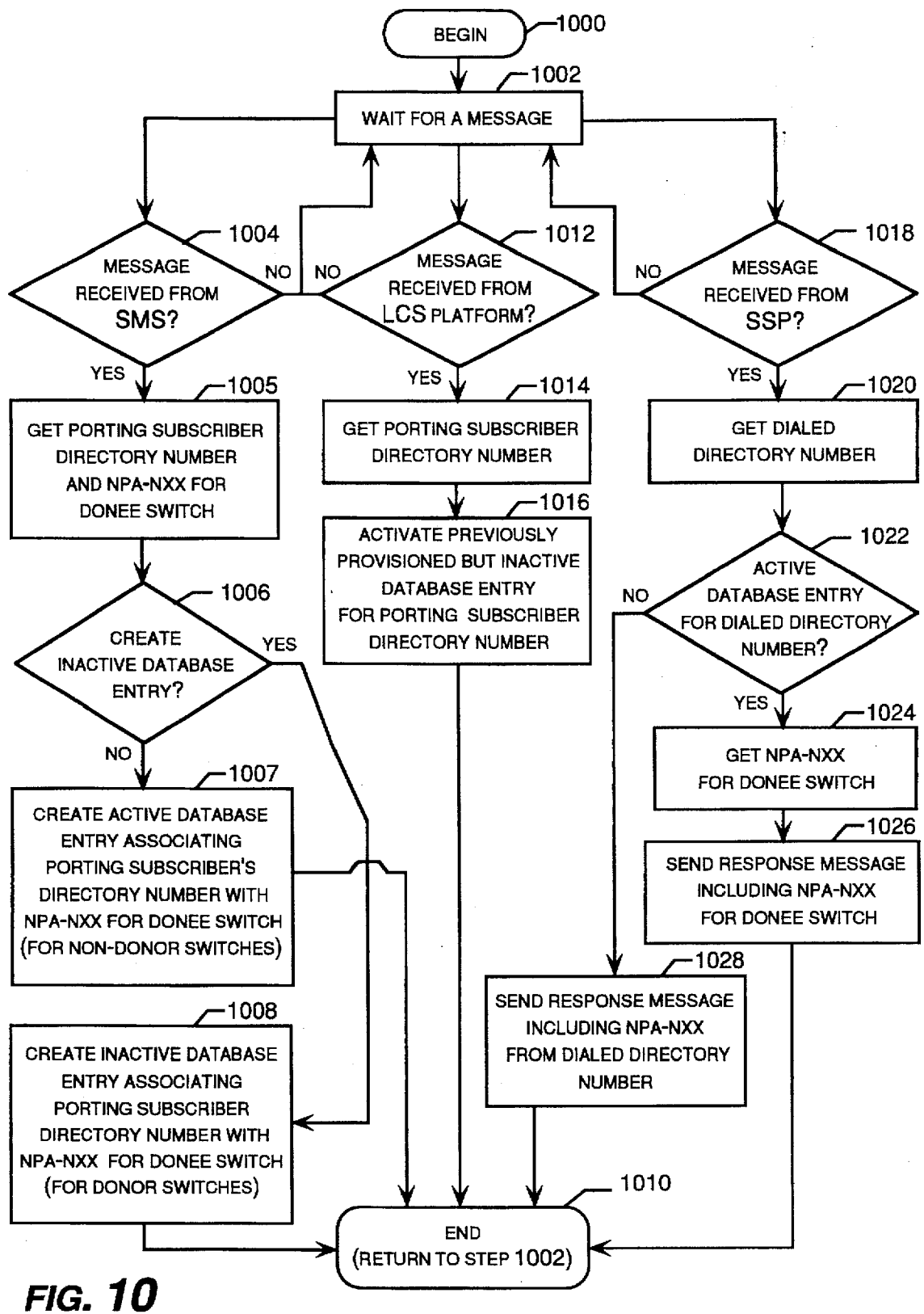
FIG. 10 is a logic flow diagram that illustrates a computer-implemented process for operating a service control point in accordance with a disclosed embodiment of the present invention.

FIG. 10 is a logic flow diagram that illustrates a computer-implemented process for operating a service control point, such as the SCPs 28a, 28b, and 28c (FIGS. 2 and 3), in accordance with a disclosed embodiment of the present invention. For this example, the SCP 28a will be used to illustrate the computer-implemented process of FIG. 10. The process begins at step 1000, and at step 1002, the SCP 28a waits for a message, typically an SS7 data link message. Step 1002 may be followed by a first branch beginning with step 1004, by a second branch beginning with step 1012, or by a third branch beginning with step 1018.

Turning to the first branch from step 1002, this step may be followed by step 1004, in which the SCP 28a determines whether it has received a message from the SMS 40a. If the answer to the inquiry of step 1004 is no, the "NO" branch is followed back to step 1002, in which the SCP 28a waits for a message. If the SCP 28a has received a message from the SMS 40a, the "YES" branch is followed from step 1004 to step 1005. This message from the SMS 40a is typically an LNP update message that instructs the SCP 28a to create an LNP database entry for a porting subscriber directory number, such as the porting subscriber directory number (404-222-2500). As described below, the SCP 28a creates an inactive LNP database entry if the directory number is within an NPA-NXX assigned to the SSP 12a (i.e., a directory number for which the SSP 12a is the donor switch). Alternatively, the SCP 28a creates an active LNP database entry if the directory number is within an NPA-NXX assigned a switch other than the SSP 12a (i.e., a directory number for which the SSP 12a is a non-donor switch).

In step 1005, the SCP 28a receives from the SMS 40a the porting subscriber directory number (404-222-2500) and the NPA-NXX (404-333) associated with the donee switch 12b. It will be appreciated that the SMS 40a previously received this data from the multi-network SMS 52 (step 808 in FIG. 8). In step 1006, the SCP 12a determines whether the LNP database entry is to be an inactive database entry by determining whether the directory number (404-222-2500) is within an NPA-NXX assigned to the SSP 12a. If the answer to the inquiry of step 1006 is yes (which for this example it is), the "YES" branch is followed to step 1008. In step 1008, the SCP 28a creates an inactive database entry in the LNP database 42a (Table 1). This entry associates the porting subscriber directory number (404-222-2500) with the NPA-NXX (404-333) for the donee switch 12b. Step 1008 is followed by the "END" step 1010, which returns to step 1002.

Referring again to step 1006, it should be understood the "NO" branch from step 1006 corresponds to a non-donor network, such as the AIN 11b or 11c. In particular, the "NO" branch from step 1006 is followed upon broadcast of the LNP data for the porting subscriber directory number (404-222-2500) from the multi-network SMS 52 to the non-donor networks (step 818, FIG. 8). The description of this branch of FIG. 10 will therefore refer to the third-party SCP 28c. If the answer to the inquiry of step 1006 is no, the "NO" branch is followed from step 1006 to step 1007. In step 1007, the SCP 28c creates an active database entry in the LNP database 42c (Table 2). This entry associates the porting subscriber directory number (404-222-2500) with the NPA-NXX (404-333) for the donee switch 12b. Step 1007 is followed by the "END" step 1010, which returns to step 1002.

It should be understood that the content of an inactive LNP database entry may be different from the content of an active LNP database entry. Those skilled in the art will appreciate that a complete LNP database entry may include a number of data items that are not needed to provision an inactive LNP database entry for remote activation by the LCS platform 50, such as a point code for the donee switch, a point code for a credit card database, the name of the porting subscriber, etc. These items may be included in an active LNP database entry (step 1007), but may be omitted from an inactive LNP database entry (step 1008). An inactive LNP database entry may therefore be augmented with this omitted information at some time following activation of the LNP database entry by the LCS platform 50.

Turning to the second branch from step 1002, this step may be followed by step 1012, in which the SCP 28a determines whether it has received a message from the LCS platform 50. If the answer to the inquiry of step 1012 is no, the "NO" branch is followed back to step 1002, in which the SCP waits for a message. If the SCP 28a has received a message from the LCS platform 50, the "YES" branch is followed from step 1012 to step 1014. In step 1014, the SCP 28a receives the porting subscriber directory number (404-222-2500) from the LCS platform 50. In step 1016, the SCP 28a activates the previously provisioned but inactive LNP database entry for the porting subscriber directory number (404-222-2500) in the LNP database 42a (transition from Table 1 to Table 2). Step 1016 is followed by the "END" step 1010, which returns to step 1002, in which the SCP 28a waits for a message.

Turning to the third branch from step 1002, this step may be followed by step 1018, in which the SCP 28a determines whether it has received a message from the SSP 12a. If the answer to the inquiry of step 1018 is no, the "NO" branch is followed back to step 1002, in which the SCP 28a waits for a message. If the answer to the inquiry of step 1018 is yes, the "YES" branch is followed from step 1018 to step 1020, in which the SCP 28a receives a dialed directory number from the SSP 12a. In step 1022, the SCP 28a determines whether the dialed directory number (404-222-2500) corresponds to an active LNP database entry in the LNP database 42a. If the answer to the inquiry of step 1022 is no, the "NO" branch is followed from step 1022 to step 1028. In step 1028, the SCP 28a sends a reply message to the SSP 12a including the NPA-NXX (404-222) from the dialed directory number. Step 1028 is followed by the "END" step 1010, which returns to step 1002. Note that the "NO" branch is followed from step 1022 to step 1024 when the entry in the LNP database 42a for the porting subscriber directory number (404-222-2500) is inactive (Table 1).

Referring again to step 1022, if the dialed directory number corresponds to an active LNP database entry in the LNP database 42a, the "YES" branch is followed from step 1022 to step 1024. In step 1024, the SCP 28a retrieves the NPA-NXX (404-333) for the donee switch 12b associated with the dialed directory number (404-222-2500). Step 1024 is followed by step 1026, in which the SCP 28a sends the SSP 12a a response message including the NPA-NXX (404-333) for the donee switch 12b. Step 1026 is followed by step 1010, which returns to step 1002, and the computer-implemented process illustrated by FIG. 10 is concluded. Note that the "YES" branch is followed from step 1022 to step 1024 when the entry in the LNP database 42a for the porting subscriber directory number (404-222-2500) is active (Table 2).

Figure 11:
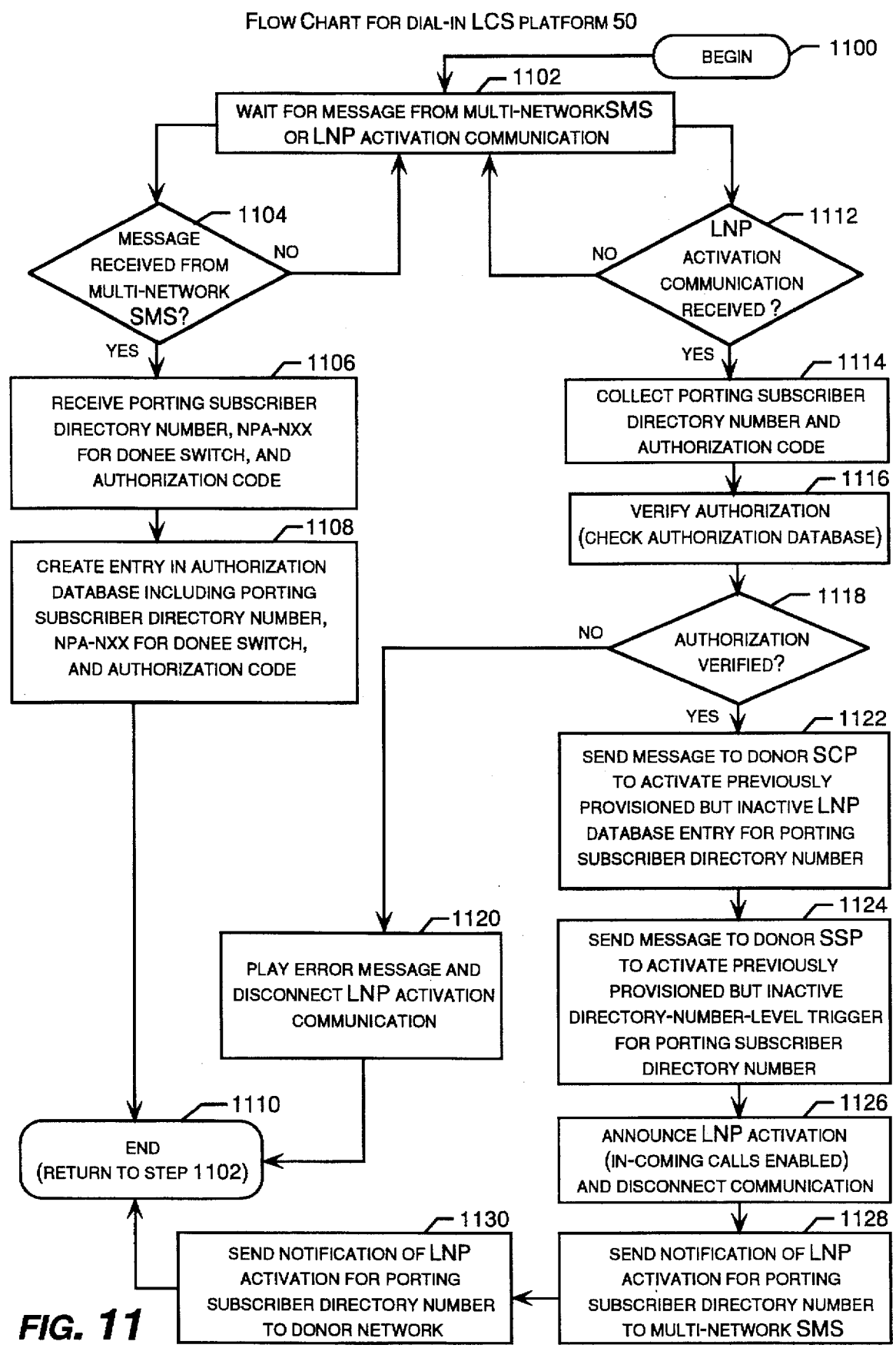
FIG. 11 is a logic flow diagram that illustrates a computer-implemented process for operating a dial-in LNP activation platform in accordance with a disclosed embodiment of the present invention.

FIG. 11 is a logic flow diagram that illustrates a computer-implemented process for operating the LCS platform 50 in accordance with a disclosed embodiment of the present invention. The method begins at step 1100, and at step 1102 the LCS platform 50 waits for a message, such as an SS7 data link message, or communication, such as an LNP activation telephone call. Step 1102 may be followed by a first branch beginning with step 1104, or by a second branch beginning with step 1112.

Turning to the first branch from step 1102, this step may be followed by step 1104, in which the LCS platform 50 determines whether it has received a message from the multi-network SMS 52. If the answer to the inquiry of step 1104 is no, the "NO" branch is followed back to step 1102, in which the LCS platform 50 waits for a message or communication. If the answer to the inquiry of step 1104 is yes, the "YES" branch is followed from step 1104 to step 1106.

In step 1106, the LCS platform 50 receives from the multi-network SMS 52 the porting subscriber directory number (404-222-2500), the NPA-NXX associated with a donee switch (404-333), and an authorization code. Step 1106 if followed by step 1108, in which the LCS platform 50 creates an entry in an authorization database including the porting subscriber directory number (404-222-2500), the NPA-NXX (404-333) associated with the donee switch, and the authorization code. Step 1108 is followed by the "END" step 1110, which returns to step 1102.

Turning to the second branch from step 1102, this step may also be followed by step 1112, in which the LCS platform 50 determines whether it has received an LNP activation telephone call for the porting subscriber directory number (404-222-2500). If the answer to the inquiry of step 1112 is no, the "NO" branch is followed from step 1112 to step 1102, in which the LCS platform 50 waits for a message or communication. If the answer to the inquiry of step 1112 is yes, the "YES" branch is followed from step 1112 to step 1114.

In step 1114, the LCS platform 50 receives the porting subscriber directory number (404-22-2500) and an authorization code from the calling party. In step 1116, the LCS platform 50 checks the authorization database to verify authorization for LNP activation. In step 1118, the LCS platform 50 determines whether authorization for LNP activation is verified. If LNP authorization is not verified, the "NO" branch is followed from step 1118 to step 1120. In step 1120, an error message is played to the calling party and the LNP activation communication is disconnected. Step 1120 is followed by the "END" step 1110, which returns to step 1102.

Referring again to step 1118, if authorization for LNP activation is verified, the "YES" branch is followed to step 1122. In step 1122, the LCS platform 50 sends a message to the SCP 12a (i.e., the SCP associated with the donor switch) to activate the previously provisioned but inactive entry in the LNP database 42a for the porting subscriber directory number (404-222-2500). In step 1224, the LCS platform 50 sends a message to the SSP 12a (i.e., the donor switch) to activate the previously provisioned but inactive directory-number-level trigger for the porting subscriber directory number. Step 1124 is followed by step 1126, in which the LCS platform 50 announces to the calling party that LNP activation has been completed (e.g., incoming telephone calls are now enabled) and disconnects the LNP activation communication.

In addition, in step 1128, the LCS platform 50 sends a notification of LNP activation for the porting subscriber directory number (404-222-2500) to the multi-network SMS 52. The multi-network SMS 52 then broadcasts a similar notification to the non-donor networks (step 818, FIG. 8). Finally, the LCS platform 50 sends a notification of LNP activation for the porting subscriber directory number (404-222-2500) to the donor network in step 1130. The donor network responds to this notification by issuing a work order that causes the porting subscriber directory number (404-222-2500) to be marked vacant, and the directory-number-level trigger for the porting subscriber directory number (404-222-2500) to be deactivated, at the donor switch 12a. Step 1130 is followed by the "END" step 1110, which returns to step 1102, and the computer-implemented process illustrated by FIG. 11 is concluded.

In view of the foregoing, it will be appreciated that the present invention provides a system and method for routing communications to a terminating station associated with a porting subscriber directory number in an intelligent switch telecommunications network configured for local number portability. It will be further appreciated that the present invention provides a system and method for providing substantially uninterrupted telephone service to porting subscribers in an intelligent switch telecommunications network configured for local number portability. It should be understood that the foregoing relates only to specific embodiments of the present invention, and that numerous changes may be made therein without departing from the spirit and scope of the invention as defined by the following claims.

What is claimed is:

1. In an intelligent switched telecommunications network, a method for routing communications to a porting subscriber directory number when reassigning the porting subscriber directory number to a donee switch, comprising the steps of:

receiving cut-over data indicating that the porting subscriber directory number has been reassigned from a donor switch to the donee switch; and in response to receiving the cut-over data, activating a previously provisioned but inactive entry in a database associated with the donor switch, the database entry indicating that the porting subscriber directory number has been reassigned to the donee switch, and activating a previously provisioned but inactive directory-number-level trigger at the donor switch, the directory-number-level trigger indicating that a query of the database associated with the donor switch is required for each communication received at the donor switch that is directed to the porting subscriber directory number.

2. A computer storage medium storing a computer program which, when executed by a computer-controlled apparatus, causes the computer-controlled apparatus to perform the method of claim 1.

3. A computer-controlled apparatus operative for implementing the method of claim 1.

4. The computer-controlled apparatus of claim 3, further comprising a dial-in platform operative for receiving the cut-over data indicating that the porting subscriber directory number has been reassigned from the donor switch to the donee switch.

5. In an intelligent switched telecommunications network configured for local number portability including a donor switch and a donee switch functionally connected to the donor switch, the donor switch associated with a group of directory numbers including a porting subscriber directory number, a method for changing a porting subscriber's local telephone service provider, comprising the steps of:

receiving carrier change data indicating that the porting subscriber directory number will be reassigned to the donee switch;

in response to the carrier change data, provisioning at the donor switch an inactive directory-number-level trigger associated with the porting subscriber directory number;

receiving cut-over data indicating that the porting subscriber directory number has been reassigned from the donor switch to the donee switch; and in response to the cut-over data, activating the previously provisioned but inactive directory-number-level trigger associated with the porting subscriber directory number.

6. The method of claim 5, further comprising the steps of:

receiving at the donor switch a communication directed to the porting subscriber directory number; and initiating a database query in response to the active directory-number-level trigger associated with the porting subscriber directory number.

7. The method of claim 5, wherein the step of receiving cut-over data comprises the step of receiving a dial-in notification.

8. In an intelligent switched telecommunications network configured for local number portability including a donor switch and a donee switch functionally connected to the donor switch, the donor switch associated with a group of directory numbers including a porting subscriber directory number, a method for changing a porting subscriber's local telephone service provider, comprising the steps of:

receiving carrier change data indicating that the porting subscriber directory number will be reassigned to the donee switch;

in response to the carrier change data, provisioning an inactive database entry in a database associated with the donor switch, the inactive database entry associating the porting subscriber directory number with the donee switch;

in response to the carrier change data, provisioning at the donor switch an inactive directory-number-level trigger associated with the porting subscriber directory number;

receiving cut-over data indicating that the porting subscriber directory number has been reassigned from the donor switch to the donee switch;

in response to the cut-over data, activating the previously provisioned but inactive database entry associating the porting subscriber directory number with the donee switch; and in response to the cut-over data, activating the previously provisioned but inactive directory-number-level trigger associated with the porting subscriber directory number.

9. The method of claim 8, further comprising the steps of:

receiving at the donor switch a communication directed to the porting subscriber directory number;

initiating a database query in response to the active directory-number-level trigger associated with the porting subscriber directory number; and in response to the database query, receiving a reply including data from the active database entry associating the porting subscriber directory number with the donee switch.

10. The method of claim 9, further comprising the steps of:

before the step of receiving the carrier change data, activating at a third-party switch a group-level trigger associated with the group of directory numbers associated with the donor switch; and after the step of activating the previously provisioned but inactive database entry associating the porting subscriber directory number with the donee switch, updating a database associated with the third-party switch with an entry associating the porting subscriber directory number with the donee switch.

11. The method of claim 10, further comprising the steps of:

after the step of updating the database associated with the third-party switch, receiving at the third-party switch a second communication directed to the porting subscriber directory number; and in response to the active group-level trigger at the third-party switch, querying the database associated with the third-party switch, in response to the database query, receiving a reply including data from the database entry associating the porting subscriber directory number with the donee switch, and in response to the reply, routing the second communication from the third-party switch to the donee switch for connection with a terminating station associated with the porting subscriber directory number.

12. The method of claim 11, further comprising the steps of:

after the step of updating the database associated with the third-party switch, marking the porting subscriber directory number vacant at the donor switch; and deactivating the directory-number-level trigger associated with the porting subscriber directory number.

13. The method of claim 12, wherein the step of receiving cut-over data comprises the step of receiving a dial-in notification.

14. In an intelligent switched telecommunications network configured for local number portability, a system for changing a porting subscriber's local telephone service provider, comprising:

a donor switch having an assigned group of directory numbers;

a donee switch;

a communications network operative for functionally connecting the donor switch and the donee switch;

the donor switch including a previously provisioned but inactive directory-number-level trigger associated with a porting subscriber directory number, the directory-number-level trigger indicating that a query of the database element associated with the donor switch is required for each communication received at the donor switch that is directed to the porting subscriber directory number;

means for receiving cut-over data indicating that the porting subscriber directory number has been reassigned from the donor switch to the donee switch; and means for activating, in response to receiving the cut-over data, the previously provisioned but inactive directory-number-level trigger associated with the porting subscriber directory number.

15. The system of claim 14, further comprising:

means for receiving at the donor switch a communication directed to the porting subscriber directory number; and means for initiating a database query in response to the active directory-number-level trigger associated with the porting subscriber directory number.

16. In an intelligent switched telecommunications network configured for local number portability, a system for changing a porting subscriber's local telephone service provider, comprising:

a donor switch having an assigned group of directory numbers including a porting subscriber directory number;

at the donor switch, an inactive directory-number-level trigger associated with the porting subscriber directory number, the directory-number-level trigger indicating that a query of the database element associated with the donor switch is required for each communication received at the donor switch that is directed to the porting subscriber directory number;

a donee switch;

a database associated with the donor switch including an inactive entry indicating that the porting subscriber directory number has been reassigned to the donee switch;

a communications network operative for functionally connecting the donor switch and the donee switch;

means for receiving cut-over data indicating that the porting subscriber directory number has been reassigned from the donor switch to the donee switch;

means for activating, in response to receiving the cut-over data, the entry in the database associated with the donor switch indicating that the porting subscriber directory number has been reassigned to the donee switch; and means for activating, in response to receiving the cut-over data, the previously provisioned but inactive database entry associating the porting subscriber directory number with the donee switch.

17. The system of claim 16, wherein the means for receiving the cut-over data comprises a dial-in platform.

18. In an intelligent switched telecommunications network configured for local number portability, a system for changing a porting subscriber's local telephone service provider, comprising:

a donor switch having an assigned group of directory numbers;

a database element associated with the donor switch;

a donee switch;

a third-party switch;

a database element associated with the third-party switch;

a communications network operative for functionally connecting the donor switch, the donee switch, and the third-party switch;

the third-party switch including a group-level trigger indicating that a query of the database element associated with the third-party switch is required for each communication received at the third-party switch that is directed to a directory number within the group of directory numbers assigned to the donor switch;

a supervisory control system operative for configuring the database element associated with the third-party switch to include an entry indicating that a porting subscriber directory number within the group of directory numbers assigned to the donor switch has been reassigned to the donee switch;

the donor switch including a previously provisioned but inactive directory-number-level trigger indicating that a query of the database element associated with the donor switch is required for each communication received at the third-party switch that is directed to the porting subscriber directory number;

the database element associated with the donor switch including an inactive entry indicating that the porting subscriber directory number has been reassigned to the donee switch;

means for receiving cut-over data indicating that the porting subscriber directory number has been reassigned from the donor switch to the donee switch;

means for activating, in response to receiving the cut-over data, the previously provisioned but inactive database entry associating the porting subscriber directory number with the donee switch; and means for activating, in response to receiving the cut-over data, the directory-number-level trigger associated with the porting subscriber directory number.

19. The system of claim 18, wherein the communications network is a voice-channel communications network.

* * * * *